United States Patent
McKiel, Jr.

(10) Patent No.: US 11,685,109 B2
(45) Date of Patent: Jun. 27, 2023

(54) METHOD AND APPARATUS FOR TRANSPOSING EXTRUDED MATERIALS TO FABRICATE AN OBJECT SURFACE

(71) Applicant: Frank A. McKiel, Jr., Colorado Springs, CO (US)

(72) Inventor: Frank A. McKiel, Jr., Colorado Springs, CO (US)

(*) Notice: Subject to any disclaimer, the term of this patent is extended or adjusted under 35 U.S.C. 154(b) by 0 days.

(21) Appl. No.: 17/645,743

(22) Filed: Dec. 22, 2021

(65) Prior Publication Data

US 2022/0219384 A1 Jul. 14, 2022

Related U.S. Application Data

(60) Continuation of application No. 17/322,716, filed on May 17, 2021, now abandoned, which is a division of application No. 15/358,588, filed on Nov. 22, 2016, now Pat. No. 11,059,217.

(60) Provisional application No. 62/258,974, filed on Nov. 23, 2015.

(51) Int. Cl.
| | |
|---|---|
| *B29C 64/118* | (2017.01) |
| *B33Y 10/00* | (2015.01) |
| *B33Y 30/00* | (2015.01) |
| *B33Y 50/02* | (2015.01) |
| *B29K 105/00* | (2006.01) |

(52) U.S. Cl.
CPC .... *B29C 64/118* (2017.08); *B29K 2105/0067* (2013.01); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 2013/0189435 A1* | 7/2013 | Mackie | B33Y 30/00 427/256 |
| 2014/0291893 A1* | 10/2014 | Hopkins | B33Y 50/00 264/308 |

* cited by examiner

*Primary Examiner* — Mohammad M Ameen

(57) ABSTRACT

In the formation of a solid object by progressively adding extruded materials to a workpiece, a mechanism is disclosed for transposing the paths by which two or more extrusion nozzles travel to deposit materials. Paralleling a surface contour of the object being formed, the paths for two or more substantially continuous extruded traces are directed in complementary fashion to cause a first extrusion trace to form the object surface while a second extrusion trace is deposited behind the first trace. At another position along the surface contour, the paths of the extruded traces may cross over one another to allow the second extruded trace to define the object surface. Where the first and second traces have a different color or visual appearance, the disclosed mechanism enables fine graphic features to efficiently be integrated into the surface of the object being formed.

9 Claims, 12 Drawing Sheets

SECTION A-A'
(PRIOR ART)

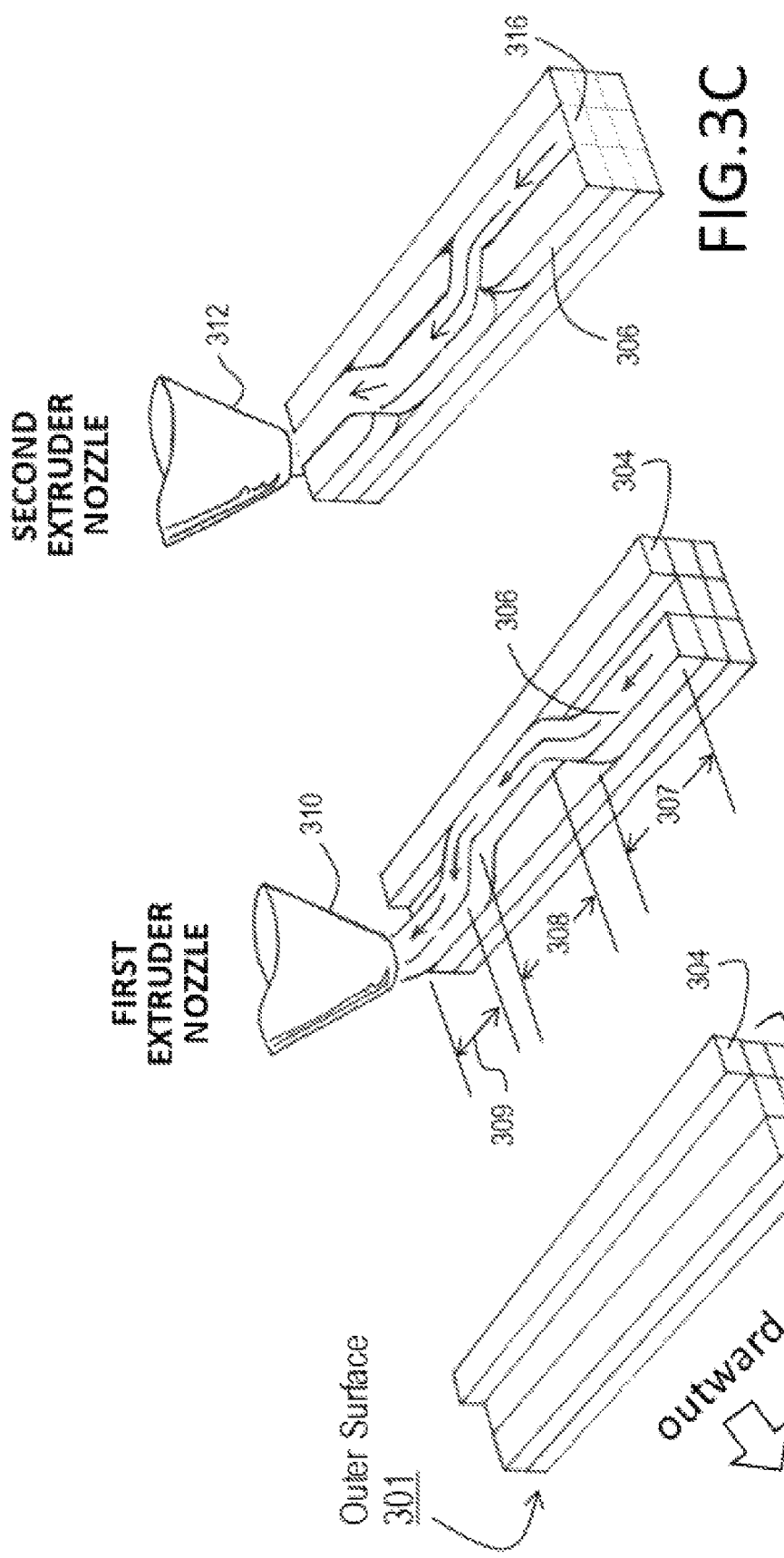

METHOD AND APPARATUS FOR TRANSPOSING EXTRUDED MATERIALS TO FABRICATE AN OBJECT SURFACE

RELATED APPLICATIONS

The present application claims the benefit under 35 U.S.C. 119(e) of provisional application No. 62/258,974 flied on Nov. 23, 2015. The present application also claims the benefit under 35 U.S.C. 120 of application Ser. No. 15/358,588 filed on Nov. 22, 2016, and of application Ser. No. 17/322,716 filed on May 17, 2021, both of which hereby incorporated by reference.

BACKGROUND

In the field of three-dimensional printing (3D printing), solid objects are formed by additive processes such as the cumulative fusing of powdered materials or polymerization of liquid monomers. Printed objects are generally constructed layer-by-layer by causing solidification to occur in a particular pattern as each layer is formed. Another popular additive process, known as fused filament fabrication, involves melting and extruding a filament of an already solid material, such as a thermoplastic, and bringing it into contact with a gradually enlarging workpiece formed from previous melt deposition. The most common materials used for 3D printing are ABS (acrylonitrile-butadiene-styrene) and PLA (polylactic acid), although other thermoplastics, resins, solutions, slurries and even food materials have been used.

In typical fused filament systems, a thermoplastic filament of about 1 mm to 3 mm in diameter is forcefully driven into one port of a small heating block and melted plastic is forced out of a small nozzle coupled to a second port of the heater. The nozzle opening may be, for example, 0.5 mm in diameter. As plastic flows out of the nozzle, the motion of the nozzle relative to a substrate or so-called 'build plate' is mechanically effected using computer-controlled motors. Heated plastic from the nozzle comes into contact with the build plate, or with a specific spot on previously deposited plastic forming a composite workpiece, where it adheres and then cools and hardens. By depositing extruded material, initially to a bare build plate and then to a workpiece that is progressively formed thereon, a finished object having specific dimensions and contours may be formed.

As used herein, the term 'molten' is loosely applied to any state of a material when it is heated or otherwise softened and is of sufficiently low viscosity to flow through a small nozzle under pressure. It is recognized that for some materials a more precise terminology, such as a 'plastic' or 'amorphous' state, may be more commonly used and the term 'molten' is intended to encompass these situations.

Through careful control of the nozzle under software control, objects of a wide variety of shapes and complexity can be can progressively formed depending on the instructions set forth in the software or scripted directions that control the motors. In many typical systems, the driving of the filament into the heater block is also motor-driven in coordination with the X-Y-Z motion of the nozzle relative to the workpiece or build surface. Motor-controlled extrusion assures a specific rate of deposition and a uniform profile of the extrudate as it contacts and deforms against the existing workpiece. Furthermore, the extruder drive motor allows for relieving pressure and momentarily ceasing extrusion, as is desirable for some objects being constructed.

Some 3D printers that operate in the fashion just described are capable of 'dual extrusion'. By using two complete sets of nozzles, heating blocks and drive motors, the twin extruders can alternately deposit two different materials, or two different colors of the same material, in the course of constructing a given workpiece. (Higher numbers of extruders can be implemented but, at present, these add considerable expense and complexity) in dual extrusion, the two nozzles are generally attached to a common carriage and move in concert, driven by the same motion stage. Only one extruder is actively emitting material and contacting the workpiece at any given time. The inactive nozzle remains on 'standby', meaning that it is kept at or near extruding temperature and maintains some molten material inside the heater block ready to be pressed out. Changing from one extruder to another involves activating a first extruder and placing a second one on standby, and vice-versa.

One technique used to change an extruder from a pressurized, actively-extruding state to a standby state is to retract the filament that goes into the heater. This is done by driving the corresponding extrusion feed motor in the reverse direction compared to the normal, forward-feeding direction. When the same extruder is to later resume its output of molten material, the feed motor must advance the filament and again build pressure to force plastic out of the nozzle. This action of the feed motor as the sole means of controlling extrusion from a nozzle creates a number of complications. For example, when an extruder is transitioned from a standby state to an active state, there is a delay before molten plastic is flowing out of the nozzle at an established rate. Consequently, a recently activated extruder cannot be immediately applied to a workpiece with the expectation that steady flow will have been achieved.

This delay occurs partly because retracting the filament to idle the extruder can cause a void or pocket to be formed inside the chamber of the heating block as air is drawn in through the nozzle. During the transition to an active state, this void must be again replaced with molten material and then additional feed is required before the chamber pressure stabilizes at a desired level and discharge rate. The changing thermal load and possibility of localized hot spots within the heating chamber further contribute to variability in discharge when extrusion is resumed from standby. Where dual extruders are used, designers often provide a practical structure, such as a separate wall, tower or 'on ramp' progressively constructed alongside the actual workpiece, where a recently energized extruder can build pressure and discharge some extrudate on a disposable side piece just before moving to the actual workpiece. Failure to establish steady flow before contacting a workpiece results in voids, unpredictable weaknesses and surface aberrations in the finished structure. Unfortunately, the need to achieve steady extrusion just as the nozzle engages the workpiece also creates extraneous threads of plastic or traces that protrude from the workpiece and often must be removed from the finished object after printing.

After a nozzle has been in use, the act of abruptly ceasing extrusion from the nozzle gives rise to another complication. The process of retracting the filament from the inlet to the heating block relieves pressure feeding the nozzle, but this pressure can rebuild as the heating block temperature may rise and plastic expansion can occur. The heating block temperature is thermostatically controlled but can nevertheless rise when the thermal load of constantly adding 'cold' filament during extrusion is suddenly halted. Furthermore, molten plastic lining the walls of the heating block and nozzle continues to slowly low under gravity and drip out of the nozzle at a very slow rate. This problem is exacerbated by the tendency for some extrusion materials to chemically change or loose viscosity if held at the melt temperature for a prolonged time. The melted material within an idled nozzle can gradually become less viscous and begin to dribble out at an inopportune time, especially as the idled nozzle hovers over the workpiece in tandem with the other, actively-extruding nozzle. To combat this effect, some designers of 3D printing software provide for simultaneous building of a so-called 'ooze shield' or 'touch-off zone' that a standby nozzle can occasionally strike against and wipe off any dribbling material that happens to be hanging from the nozzle. Failure to address this issue can result in strings or blobs of one extrudate being connected to, or folded into, the workpiece in an unpredictable and undesirable fashion. This is especially noticeable when dual extruders are used to print in dramatically contrasting colors. Another solution to this issue involves shutoff valves or the like to more positively assure cutoff of extrusion flow. Nevertheless, due to delay in pressurization and the risk of fine plastic strings formed by pulling away from a workpiece, it is still desirable to minimize the number of extruder switch-overs executed per layer of the build.

Compared to subtractive processes (sawing, drilling, milling, turning, stamping, etc.), the additive processes of 3D printing are generally very slow, especially when rendering high-resolution or highly detailed workpieces. Traditional processes tend to use raw material less efficiently and processing time increases with complexity, but simple operations on even large objects (such as milling and boring engine blocks) can be accomplished fairly rapidly. In contrast, additive processes efficiently place material specifically where it is needed but processing times are dramatically affected by workpiece volume rather than workpiece complexity.) An additively built workpiece often requires hundreds of thin layers of printing. Any step that adds delay at each layer is multiplied many-fold. For an average 3D printed object ranging in size from palm-sized to brick-sized objects, build times can range from 20 minutes to a full day or more. Because of the delays involved and the need to mitigate unwanted effects when changing from one extruder to another, it is desirable to minimize switching between extruders while making a given 3D printed object.

This consideration makes intricate patterns of two or more colors overwhelmingly difficult to achieve in common filament-fusing 3D printers. When two-color designs are used, these generally apply to printing coarse features or to layers of different colors rather than having fine (such as 1 mm sized) features of different colors closely interleaved on a common surface, for example. In the conventional practice for controlling such 3D printers, labels, markings, insignia or decorative patterns that are roughly flush with an objects outer surface are difficult to render without extensive extruder switching and the attendant delays and extraneous stringing of material.

There is a need to enable continuously-extruding additive manufacturing machines, such as fused filament printers, to render surface appearance features, such as graphics, lettering or decorative finishing as part of printing a 3D object in a manner that is efficient in terms of time and material and does not undermine the quality, strength or appearance of the finished object.

BRIEF DESCRIPTION OF THE DRAWINGS

Various exemplary embodiments are illustrated by way of example, and not by way of limitation, in the figures of the accompanying drawings, in which like reference numerals refer to similar elements and in which:

FIGS. 3A-3C portray a sequence of depositing material in a particular pattern in accordance with the present teachings;

DETAILED DESCRIPTION OF THE PREFERRED EMBODIMENTS

Figure 1:
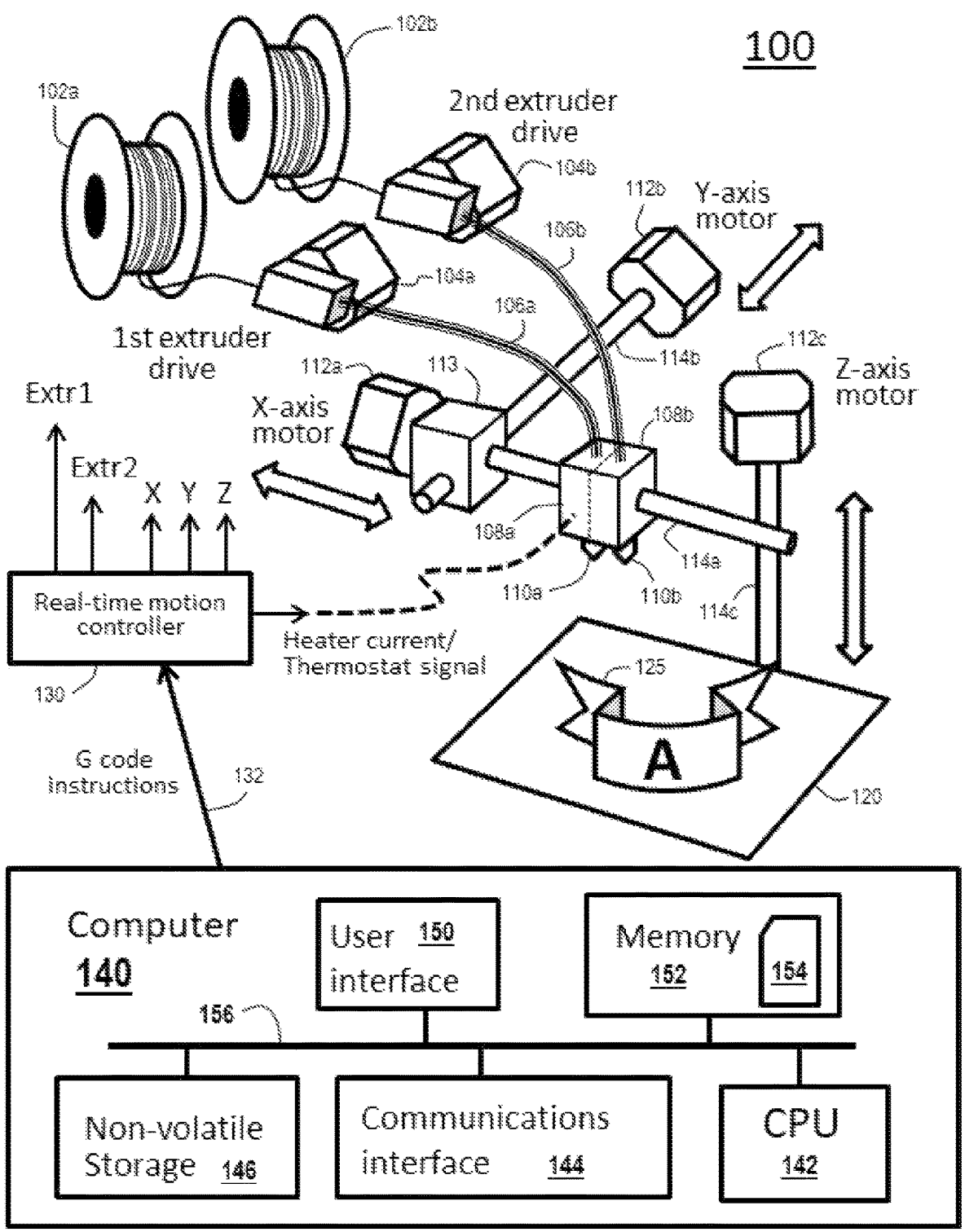
FIG. 1 is a pictorial describing the components in a typical fused filament 3D printing system as a context within which the present teachings may be applied.

A preferred method and apparatus for achieving a patterned surface feature on a 3D printed object are described. In the following description, for the purposes of explanation, numerous specific details are set forth in order to provide a thorough understanding of the preferred embodiments of the invention. It is apparent, however, that the preferred embodiments may be practiced without these specific details or with alternative, equivalent arrangements. In other instances, well-known structures and devices are shown in block diagram form in order to avoid unnecessarily obscuring the preferred embodiments of the invention.

Although various exemplary embodiments are described with respect to forming a pattern of contrasting colors on the surface of an object, it is contemplated that various exemplary embodiments are also applicable to achieving variable textures, contours, translucencies or material properties across a given surface.

In accordance with a preferred embodiment of the present teachings, a multiple-extrusion filament fusion printer achieves finely interleaved placement of material from different extruders at the surface of an object in an efficient manner, which, in comparison to previously known approaches, results in faster printing, fewer extruder changes and fewer side effects from idled nozzles. Additionally, the present teachings allow for a selected extrusion material, such as an expensive metallic, electrically conductive or thermochromic filament, to be used sparingly in a pattern on the surface of an object.

More particularly, a first extrudate is deposited to roughly parallel an object's surface but the exact path of depositing the extrudate is controlled to occur in a roughly serpentine pattern. At points on the object's surface where a first extrudate is to appear, the nozzle's tool path follows alongside the designed contour of the object and forms the object's surface. At this point, the extrudate trace may be said to have 'surfaced' with respect to defining the object's outer shape and appearance. At places on the object's surface where a second, subsequently applied extrudate is expected to appear, the first extrudate is laid down slightly away from the object surface, set back inwardly by approximately the width of an extrusion trace. The first extrudate may be described as 'submerged' at these positions along the surface. To complete the object's surface, a second extrudate is then deposited from a second nozzle approximately paralleling the path of the first extrudate, but shifting course in exact complement to the pattern of surfacing and submerging established by the first extrudate. The finished product exhibits a substantially smooth surface having thereon any desired pattern of alternate colors or materials from the two extruders, while also only requiring the printer to execute one or two extruder changes per printed layer.

In contradiction to established practice. In this art, the second pass is performed at substantially the same Z-height—the same layer elevation—as the first pass. The conventional wisdom would hold that driving the second nozzle with little to no clearance into a pre-existing trace is inadvisable, has no useful effect and could create squashed or sprayed extrudate, if any at all. In contrast, the present teachings encourage crossing of extruded traces within a single build layer because. It is discovered that very brief crossing of one trace over another, even. If it results in momentarily blocking an active nozzle, has no detrimental effects and any pressure buildup caused by blocking the nozzle is quickly equalized by reaching an opening or void within milliseconds after being blocked. (In fact, any brief pressure buildup that could occur at low feed rates would only help resume flow when a subsequent void is encountered and aids in void filling even in the opposite direction of nozzle travel.) As will be explained, driving the nozzle into a pre-existing trace also secures bonding between the traces. This effect is especially useful where, due to operating principles described herein, a small isolated blob of one extrudate must adhere to the workpiece despite being cut off, in a sense, from the remainder of the trace or extrusion flow from which it was formed.

It is a feature of these teachings that, as a second nozzle crisscrosses over a trace previously deposited by a first nozzle at the same layer height, tillable voids to accept extrudate are encountered so reliably and repeatably during printing that the second pass nozzle persistently creates substantially the same flush extrudate profile as it would during normal printing on a flat surface.

Creating the finished surface may be simply described as follows: At any given point along the surface of an object, a first extrudate is at the surface and a second extrudate is hidden behind the first. At a different place, where the second extrudate needs to be presented at the surface, the positions of these two extrudates are swapped. (in the case of three or more traces shown below, 'surfaced' versus 'submerged' traces may have to deviate from their nominal paths by a somewhat greater amount.) The present teachings result. In a fast, efficient, continuously-flowing technique. All surface points that need to present a given material or color of extrudate are completed in one long trace rather than. In a piecemeal fashion.

The selection of which of the two or more extrudates is to be outermost at a given portion of a printed surface may be controlled by an established pattern. This pattern may be specified by an object's designer and may correspond to a 2D graphic pattern such as an image, a logo, a line drawing, text, photographic images, or the like. The pattern may also be algorithmic. In nature such that the choice of extrudates to appear at any portion of the surface may be decided by performing a calculation or executing programmed logic. Some patterns that are readily. In this latter fashion are spirals, honeycombs, basket weave patterns, checkered patterns, plaid, etc. Additionally, some computations can mimic seemingly random effects on the surface of an object even though the decision of one extrudate versus the other is, in fact, determinate. Even truly random data may be sampled to establish a specific pattern of switched extrudates. For simplicity in the current description, arbitrarily chosen images of the first type mentioned above will be assumed as the source pattern. The algorithmically-derived or sampled patterns may always be converted to a rasterized form that comports with the description below, but might also be calculated 'on the fly' only as each pixel value needs to be evaluated. Either implementation in the motion-determining software is equally suitable for implementing the teachings described herein.

One method of expressing a pattern desired to appear on a surface of an object is through raster image data such as a bitmap file. A bitmap file is usually used to represent image to be displayed or printed, but essentially describes a two-dimensional pattern of pixel values (pattern data) that can be interpreted and rendered in other ways. A convention may be adopted, for example, in which darkened pixels in the bitmap represent points at which a first extrudate is to 'surface', or to indeed form the surface of, a 3D printed object. Lighter pixels may represent points at which a second extrudate, rather than the first extrudate, is to be present at the surface of the object. (Of course, the choice of how a given pixel value corresponds to using one extruded color or another is entirely arbitrary.) Thus, at each point where an extruded material defines the surface of the object, that point will be formed by either the first extrudate or the second extrudate. Wherever one extrudate is at the surface, the other extrudate is obscured or 'submerged', preferably hidden immediately behind (inwardly displaced along a direction normal to the surface) the prominent extrudate trace. The first and second traces are preferably kept. In close proximity so that a rapid switching is achievable with minimal tool movement and so that the pattern-depicting composite of the two traces is kept relatively narrow, such as within the combined width of the two traces.

Stated in another way, two tentative nozzle paths are calculated. The first path is designed so that an extruded trace will conform to the designed contour of the object's outer surface. A second path, paralleling the first path, is preferably calculated to be alongside and displaced from the first path by approximately the width of an extruded trace. At any point along the object's surface, one extruded trace will conform to the first path while, in complement, the other extruded trace will conform to the second path. At points where the object surface is to be represented by the second trace rather than the first, actual tool paths of the respective extruders are transposed between the two possible nozzle paths, essentially swapping places to submerge the formerly prominent trace and to surface the previously hidden trace.

This swapping of trace paths can take place for even a brief interval across the surface being formed. This means that the width of a graphic feature on the surface of the object formed by this swap can be on the order of the width of an extruded trace. For example, where an extrusion flow coming out of a 0.5 mm nozzle flattens as it meets the workpiece, it may result. In an extruded trace that is 0.55 mm wide but only 0.2 mm tall. (The Z-direction thickness is determined by the overall per-layer print thickness selected for the build.) Under these conditions, the present technique can achieve minimum 'pixel' widths on the order of 0.6 mm wide. Alternative extrudates can surface and submerge at fairly high spatial frequency and allow text or graphics to appear on the surface of the final object. This technique has the additional advantage of eliminating separate post-printing steps and of creating a pattern that is effectively indelible by being, in a sense, imbedded deeply (at least by one extrusion width) into the object's surface. It is further possible to label surfaces and contours of an object (even interior-facing, concave or irregular surfaces) that would be difficult to reach or print in a conventional manner after the object was printed. It is well known that, even for outwardly accessible surfaces, the fused filament process typically produces a ribbed surface that can be difficult to paint or screen print upon. The presently taught technique avoids the need to address this challenge.

In contrast to traditional injection molding, 3D printing does not require a hardened mold and is particularly suited for producing one-of-a-kind or short run objects. This attribute, in conjunction with the presently introduced technique for controlling the appearance or differentiating the surface of an object, makes it possible to create, for example, personalized bracelets, labels, tags or other items. Software processes operating according to the present teachings can combine 3D object designs and graphic patterns to rapidly create new machine control instructions for building an object that includes the graphic features in its construction.

Figure 9:
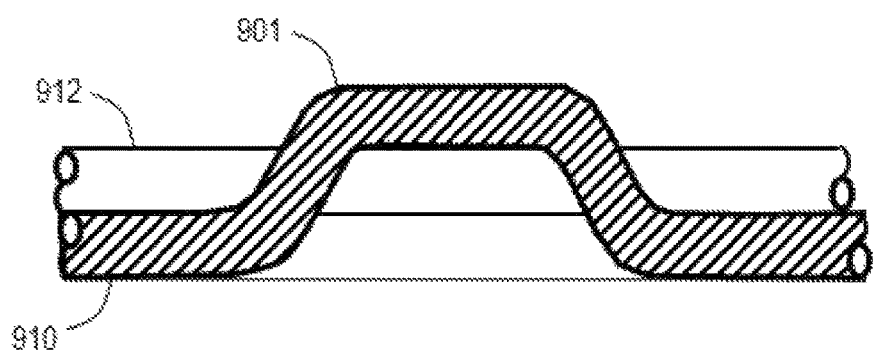
FIG. 9 depicts a variation for producing raised features on the surface of an object in accordance with an exemplary embodiment of the present teachings.

Raised printing may also be achieved by causing one trace to move outward more so than the other trace when it is to surface. For example, one trace may shift outward by the width of two extrusion traces and the other trace may deviate more mildly or not at all. (This effect is depicted in FIG. 9 of the drawings.) This will result in the first trace depicting the graphics in relief, in addition to perhaps depicting a pattern of color change.

A significant advantage of the presently taught approach is the ability to more readily create markings along the more-or-less vertical sides of a workpiece rather than just on the topmost surface. A round or ring-shaped object, such as a vase, bracelet or napkin ring having finely detailed graphics depicted, may be readily formed with minimal extruder changes and minimal formation of extraneous 'strings'. The graphic features may wrap around on all sides of the object, continuously so, if needed, by selectively transposing two or more extrusion traces at each build layer.

FIG. 1 depicts a typical 3D printing system 100. Material for making items is provided in the form of a filament wound on spools 102a and 102b. Filament from spool 102a is fed into a first motor-driven extruder 104a. Likewise, in a dual extruder system, filament from spool 102b is fed into a second motor-driven extruder 104b. Under control of a motion control computer, such as controller 130, extruders 104a and 104b push the filaments through flexible tubes 106a and 106b, respectively. Each filament, driven from some distance away, is forcefully fed into its respective heater block 108a and 108b. Each of the heater blocks comprises a heating element and a temperature sensing element, such as a thermocouple. The temperature of the heating blocks is typically controlled by a temperature controller using, for example, a PID control algorithm. This temperature control functionality may be implemented in controller 130. The current temperature of each heating block is sensed by its respective thermocouple and, if the sensed blocked temperature is too low, electrical current is applied to the heating element for that block.

Integrating the heater control function into controller 130 makes it possible for the heater block temperatures to be programmatically controlled within the same software or script that controls the extruder and nozzle motion motors. During authoring of the machine instructions, control of heater block temperatures is thus made available to the designer of a workpiece being constructed. This setting may be optimized for different materials, flow rates and desired physical characteristics of the finished object.

The output of heater block 106a is at the tip of nozzle 110a. Heater block 106b ejects extrudate from the tip of nozzle 110b. In the configuration shown, both nozzles 110a and 110b move horizontally. In tandem as driven by X-axis motor 112a and Y-axis motor 112b acting upon respective lead screws 114a and 114b. (For simplicity, the lead screw threads are not explicitly drawn.) In the arrangement shown in FIG. 1, Y-axis motor 112b turns lead screw 114b to cause a block 113 to move further or closer to the Y-axis motor. X-axis motor 112a and its corresponding lead screw 114a move along with block 113. X-axis motor 112a may also independently turn lead screw 114a to cause the heater blocks 108a and 108b to move in a direction orthogonal to the direction of motion created by X-axis motor 112b. By this arrangement, nozzles 110a and 110b can be moved around in a horizontal plane along two separate axes, essentially covering an entire planar surface.

Z-axis motor 112c may be controlled to turn lead screw 114c so that it can, in turn, control the elevation of a work surface or "build plate" 120 relative to the nozzles 110a, 110b. A workpiece 125, which is an object being constructed progressively by addition of materials from either or both of spools 102a, 102b, is shown on build plate 120, though it should be understood that just before a construction begins the build plate will generally be blank until the extruders deposit the first layer of traces. In the arrangement shown in FIG. 1, a build will be initiated by driving Z-axis motor 112c such that build plate 120 is elevated to a point that nearly brings it in contact with nozzles 110a and 110b. To form the first layer of a workpiece, X-axis motor 112a and Y-axis motor 112b will be controlled to move around just above the build plate while either or both of extruder drives 104a,104b force molten filament to be extruded from the nozzles 110a and 110b. Once an initial layer of material has been deposited in this fashion, then Z-axis motor 112c will generally be directed to turn lead screw 114c slightly so that build plate 120 moves downward and further away from the plane in which nozzles 106a, 108b are moving. At this point, the apparatus is prepared to lay down a second layer of material upon the initial layer that is contacting build plate 120. The remainder of the workpiece is constructed by iteratively lowering the build plate (effectively raising the nozzles relative to the build plate) using Z-axis motor 112c and then coordinating the motion of nozzles 110a,110b to deposit extruded filament under the control of X-axis motor 112a, Y-axis motor 112b, and either or both of extruder drives 104a and 104b. This process is repeated until all layers have been deposited and the workpiece is completely formed.

For clarity and simplicity, FIG. 1 is mainly a conceptual drawing and excludes many gantries, support structures or framework and other details such as pulleys, belts, wires, linear and rotary bearings, thrust bearings, etc. It should be understood that, while FIG. 1 depicts one possible arrangement for control motors to move nozzles about in a controlled fashion with respect to build plate 120, a wide variety of possible designs are possible and commonly implemented. Other configurations are known where nozzles move in X, Y and Z axes over a stationary build plate. Some devices use three separate arms that may each vary. In length to effectively triangulate a position for a nozzle at any given moment. All of these techniques are well-known and equivalent for the purposes of the current teachings. The current teachings would be equally applicable to, and achievable by, all of these variations. The motors can be stepping motors, DC servos, linear actuators or be of any other form to drive the required motions.

One commercially available 3D printer that operates in roughly the manner just described is the 'Ultimaker Original' manufactured by Ultimaker BV headquartered in Geldermalsen, Netherlands. (The X-Y motion on this model is accomplished using belts and pulleys rather than lead screws, but the relevant operating principles remain the same.) This printer is available with a real-time controller that uses the Marlin open source firmware hosted on an ATmega™ microcontroller from Atmel Corporation. This model of 3D printer, when equipped with the available dual extruders, is one suitable platform for implementing the techniques described elsewhere herein.

In FIG. 1, a real-time motion controller 130 is provided for exercising control over all of the aforementioned mechanisms, including extruder motors, and the motors that control the relative positioning of nozzles 110a, 110b and build plate 120. Controller 130 may also receive inputs from limit switches (not shown) which are commonly used in motion control systems and serve to safely limit the movement of motor-driven parts as shown in the arrangement of system 100. A Z-axis limit switch also often assists in calibrating the distance between the nozzles and the surface of the build plate.

Controller 130 also controls heater blocks 108a and 108b and may also receive input from a thermocouple for each one of the heater blocks, so controller 130 can be involved in establishing a fixed temperature for each heater block which, as mentioned before, can be subject to software control. In some implementations, the build plate 120 is also heated and the controller 130 controls the heating of the build plate. If this is used, controller 130 receives temperature readings from a thermocouple from the heated build plate and sets the build plate temperature based on instructions received via G-code instructions, which are described below.

There may also be other peripheral devices that are controlled by the controller. For example, it is common for a cooling fan to be attached somewhere in the vicinity of heating blocks 100a, 100b. The optional cooling fan moves in conjunction with the nozzles and hastens the cooling of the newly deposited extruded filament, as is desirable for some builds.

Controller 130 generally implements 'real-time' control over the motors and other components, meaning that where specific timings and speeds are called for to deposit extrudate. In a desired pattern, the firmware. In the controller is dedicated to adhering to the specific timings to achieve consistent results. This is very important given the speed with which the nozzles must move for some projects and the fact that the extruded filament is emitted from the nozzles more or less continuously. It is important that the controller 130 not hesitate at inopportune times which could cause because extruded material to build up in some places. In an undesirable fashion or cause other anomalies or interruptions that would be apparent. In the finished object being built.

Accordingly, controller 130 generally does not make calculations as to how to build a certain object but instead accepts fairly simple, sequential instructions in the form of so-called "G-code" instructions. (G-code programming is best known in the context of automated or so-called CNC (Computer Numerical Control) machining and is described in EIA Standard RS-274.) The detailed instructions of how the motors and extruder drives must be coordinated to build a given object are calculated by a separate computer before the time that the object is actually built on the platform 120. These calculations are reduced to discrete commands of positions and speeds for operating the various motors. To ensure timely control of the various moving parts, real-time controller 130 acts as a 'slave' processor that simply reads and acts upon the sequence of relatively simple motor control instructions that have been prepared beforehand by a separate 'master' processor.

A master processor may determine, for example, that part of an object build requires a circular arc to be printed and may apply trigonometric functions to calculate a series of short segments to form the arc. As each segment involves moving the nozzles in a straight line from a first X-Y position to a second X-Y position, these beginning and ending coordinates are each listed as a single line of G-code instruction along with the rate at which the movement is to occur. The same G-code instruction may also instruct that during the movement, an extruder motor is to drive a filament forward by a given amount.

The desired motion is called for by the instructions regardless of whether the actual motors of the 3D print mechanism are stepper motors or DC servos and regardless of how many turns of a shaft, pulley or lead screw are needed to accomplish the displacements specified in the G-code instruction. It is the job of the real-time controller 130 to determine, for example in the case of stepping motors, the quantity and timing of current pulses that must be applied to one or more motor windings to accomplish the motion called for in the G-code instructions. It may be said that the G-code instructions are largely independent of the specific 3D print mechanism being used and that the G-code instructions are therefore fairly portable to any printer (subject to maximum print size, of course.) The real-time controller associated with a given 3D printer mechanism interprets the G-code commands and determines how to accomplish the specified motions in the context of that particular mechanism.

In FIG. 1, a separate computer 140 is shown as an example of a master processor for producing G-code instructions and may be fulfilled, for example, by any variety of personal computer. Computer 140 is shown to comprise a central processing unit or CPU 142, a communications interface 144, a non-volatile storage 146 and a user interface 150. Computer 140 is also shown to comprise a memory 152 which is shown to contain, among other things, pattern data 154, the purpose of which will be further described below. The various elements shown inside computer 140 communicate over a data bus 156. User interface 150 may comprise an end-user display, such as a LCD or LED flat-panel display and one or more user input devices such as keyboards, pointing devices, etc. Communications interface 144 may allow data communications with other processors and may be implemented in the form of an Ethernet connection, a wireless LAN connection, a USB interface, an RS-232 interface, or any of a number of other possible communications ports and protocols. In particular, communications interface 144 may be the means by which computer 140 communicates G-code instructions 132 to real-time motion controller 130. A user may connect computer 140 to real-time motion controller 130 through a USB cable or so-called "FireWire" connection. Alternatively, a user may insert a portable data storage device into a USB port of computer 140 and transfer files including G-code instructions 132 onto the portable storage device (or so-called 'thumb drive' or 'jump drive'). The user may then withdraw the drive from computer 140 and plug it into a similar USB interface (not shown) supported by controller 130. When a build is commenced, controller 130 may read the G-code instructions directly from the portable data storage device and responsively cause the heaters, extruder drives and X-Y-Z drive motors to actuate.

Non-volatile storage 146 corresponds to the typical so-called 'hard drive' commonly found in personal computers. Non-volatile storage 146 typically contains boot information, operating system executables, and applications that the computer can load into memory 152 and execute. Non-volatile storage 146 also provides a persistent store for user data files, such as STL flies (which describe 3D surfaces), G-code files and pattern data files. Memory 152 serves to temporarily store instructions for CPU 142, as well as data including operating system components, applications, and data used by applications. Of particular note, memory 152 is shown to contain a body of pattern data 154 that may be accessed by CPU 142 in a manner that will be described further below.

One typical way in which users employ the overall system shown in FIG. 1 is to load a 3D modeling application from non-volatile storage 146 into memory 152 whereupon CPU 142. Is caused to present a depiction of three-dimensional space (although it is a two-dimensional display) upon a display screen as part of user interface 150. (There are also some web-based 3D development applications accessible via a web browser executing on computer 140.) Using the 3D modeling application, a person designing an object to be 3D printed can select a variety of shapes such as cubes, cylinders, spheres, cones, etc. in order to describe the shape of the object that they desire to have built. Such an application typically allows a user to manipulate a simulated 3D view by panning, zooming and rotating in various axes until the user is satisfied that they have adequately described the shape that they want to build. Some commonly known 3D modeling tools include Blender, Autodesk 123D, SketchUp, TinkerCad and SolidWorks. Some of these tools are the same ones also used to create engineering mockups or animated feature films. The 3D modeling application then converts the user's model into a specially formatted file called an 'STL file' which essentially describes the surface of the users object. In terms of a large number of interconnecting triangles. (in other words, the surface of the object is tessellated.) The next step. In the typical process is for the user to invoke another application, known as a "slicer", which receives the ST file and converts. It into a series of commands motion control commands appropriate for building each thin layer or slice of the finished object that has been described in the STL file. One well known slicer application is called 'Cura' and is developed and maintained by Ultimaker BV. The slicer generates the G-code file as raw instructions for controlling the motors of the 3-D printer and this is the set of G-code instructions 132 that are conveyed to controller 130. To generalize, additive manufacturing systems fabricate an object according to a design description of the object that describes which portions of a build space are to be occupied by the object once. It has been completely fabricated. In the course of converting a design description to layer-by-layer instructions, the intersection of a plane (generally parallel to the build plate surface) and the design description is calculated and yields one or more designed surface contours that describe the shape of what will become the surface of the printed object for a given layer of the build. In the case of extruding machines, slicing software applications generally create instructions that direct the nozzle(s) to follow this contour smoothly to form the outer surface or wall and then to ill the contained internal spaces, either solidly or more sparsely using arbitrary mesh-like fill patterns.

It is important to note that, while 3D modeling applications and slicers are the typical way in which a user envisions and describes an object and their description becomes converted into motor control commands, this is not the only way to produce G-code for producing 3D print objects. Other techniques are known for more efficiently describing objects or generating the G-code in certain circumstances. For example, some shapes, such as a geodesic dome or a spiraling seashell, are much more easily described in mathematical terms rather than tedious manual placement of carefully sized blocks, spheres, cylinders or other primitives. Therefore, there are other tools that generate either STL files or G-code based on mathematical formulas and such—more directly than operating the way that most 3D modeling tools do. Of course, employing the latter approach requires more advanced mathematics and visualization skills from a designer compared to the manipulative user interfaces presented by the 3D modeling tools. On the other hand, however, organic shapes, such as human hands, faces, plants, animal bodies or intricate combinations of basic shapes (such as a train engine) might be better assembled using one of the 3D modeling tools.

Figure 2A:
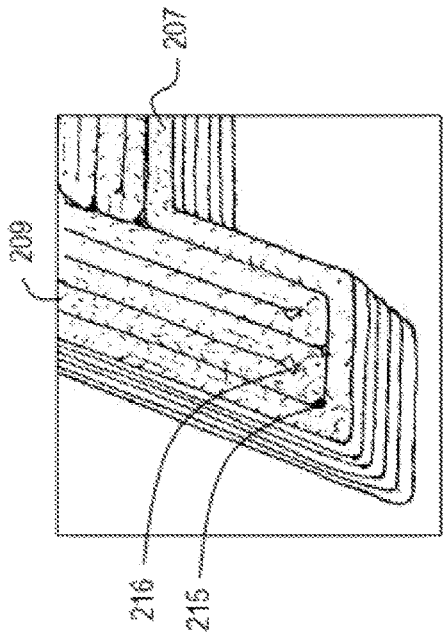
FIGS. 2A-2C are pictorials showing how a graphic feature is typically rendered on a printed object in accordance with prior art practices.
Figure 2B:
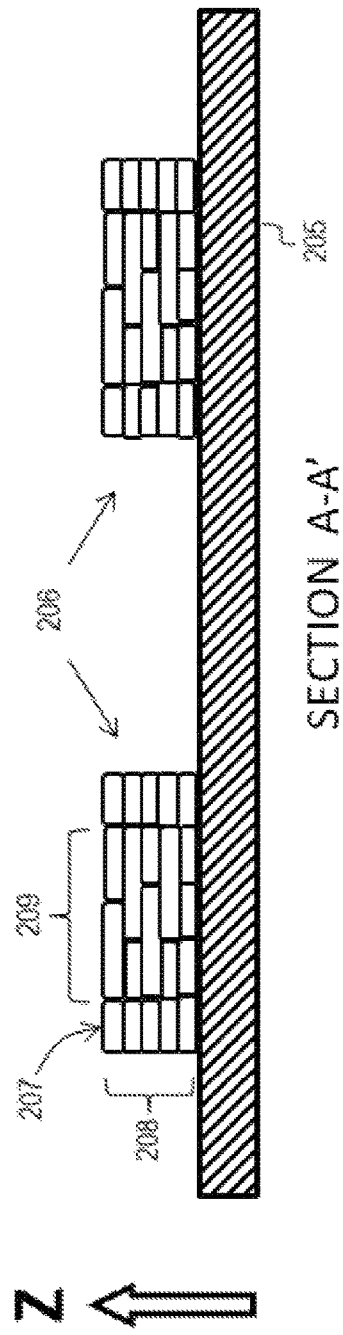
Figure 2C:
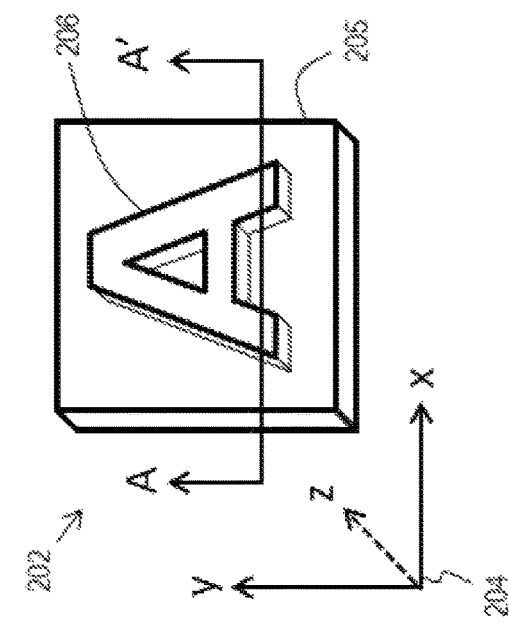

One of the previously known manners in which existing user applications have been able to create graphics or lettering on a finished 3D printed product is to include such shapes as protrusions on the surface. For example, if one desires to make a tag with lettering, then the tag 'substrate' or 'body' is formed more or less flat against the build plate. A number of layers of extrusion are deposited to form the tag itself and then a number of subsequent layers are deposited stacked on top of the initial layers to form raised letters. This form of construction is depicted in FIGS. 2A-2C. (it should be noted that, in dual extruder systems, another technique for depicting graphics or lettering on the surface of an object involves separately defining two shapes, one shape from each color, and then superimposing the two shapes within either a 3-D modeling tool or a slicer software application. While this can work reasonably well for fairly coarse features, it is far too tedious of an approach for fine features. Furthermore, this typical approach may also inefficiently use special filament materials, such as metallic or iridescent materials intended for surface effects, for filling a significant amount of the interior of an object.

Representing a prior art approach, FIG. 2A shows a workpiece 202 having been constructed in the typical fashion just described. For reference, axes 204 are provided as a legend to show orientation of the workpiece relative to the motor directions described in FIG. 1. Axes 204 depict that the Z-axis is in a direction that comes outward from the plane of the drawing. As can be seen, workpiece 202 comprises a flat base of one or more layers 205, and upon which is further formed a graphic feature 206, in this case having the shape of the letter 'A'. Graphic feature 206 is formed atop the initial layers 205 by adding further passes of extruded layers. In a particular pattern. FIG. 28 shows a cross-section of the same workpiece that was shown in FIG. 2A. FIG. 2B shows that the graphic feature 208 has been formed by successive layers 208 of deposited filament material. This detail also shows a typical practice wherein each layer of the graphic comprises outline traces 207 defining an outer wall of the desired feature, followed by filling traces 209 deposited to fill in the space inside the feature. Although slicers tend to direct the outlining of the features in a consistent manner, different slicers use a variety of filling patterns and may even leave voids (to reduce material usage) or may vary the filling pattern layer-by-layer to avoid warping. This variability explains the irregular appearance of the filling traces 209 in FIG. 2B.

FIG. 2C is a close-up view of the graphic feature 206, viewed from roughly the same angle as in FIG. 2A. FIG. 2C depicts what is typically observed on the surface of a feature that is formed in this manner in that the path of the tool outlining the shape is evident as well as the pattern of motion of the tool in filling in the internal area of the graphic. The outline traces 207 and the filling traces 209 show evidence of chatter from the motion of the heated nozzle as the topmost layer was formed. It is also often observed that either small voids 215 or excess material buildup 216 lends to a rough outer appearance for the graphic feature 206. Thus, the finished appearance of the article is degraded by the use of the tool to move in the X-Y axis to lay out the graphic feature and this approach is also relatively complex in terms of the calculations needed to determine a useful ill pattern on the part of a slicer. Finally, this technique suffers from limiting the surfaces on which graphic features such as graphic 206 may be formed as part of a workpiece. While it may be possible to control a extrusion nozzle to cause protrusions on the vertical sides of an object as it is being built, this is not advisable on many 3D filament forming equipment because some parts of the build, such as the transverse stroke running horizontally across the capital letter 'A', would require extrusion from the nozzle over an area that is not supported underneath. In practice, extrusions over open areas succumb to gravity and droop or sag, causing the intended feature to be malformed.

Consequently, graphics and features that need to be depicted in relief, especially relief with contrasting color, present a significant challenge for extrusion-type printers if they are to be exhibited on more or less vertical portions of a workpiece. This attribute limits the ability of such printers to depict high-resolution graphics or lettering on anything but a topmost surface of an object being built.

FIGS. 3A-3C of the drawings depicts a progressive building process in accordance with the present teachings by which high-resolution graphics or lettering may be easily formed on the surface of an object being built using a fused filament process. FIGS. 3A-3C show the state of a small portion (spanning a few millimeters) of an existing workpiece that is being progressively or additively constructed. Facing leftward, an outer surface 301 is designated as a surface upon which graphic features are to be formed. In accordance with the present teachings, although it should be understood that 'outer' is a relative term and the surface could be an inward-facing surface, such as the interior of a beverage cup. Outer surface 301 may be part of a 'multiple extrusion surface region' that is to be substantially formed using two or more extruded traces in alternating intervals per the present teachings.

For convenience, reference is often made herein to an 'outer' surface of an object, but it should be apparent that any portion of an object may be formed in the manner described so that a pattern of high spatial frequency may be made of traces from multiple extrusion sources. Even where the present teachings are applied to varying the composition on a surface of an object that is observable, topologically exterior or open to the ambient atmosphere, that surface may be inwardly facing, such as when a picture or text is to appear on the inside walls of a drinking vessel or on the inside surface of a so-called 'enchanted egg' which is only observable through a tiny hole. Graphic features may even be formed on surfaces disposed completely inside of an object which are not observable until a part of the finished workpiece is removed, peeled back, machined away, cut open or broken off.

In FIG. 3A, a total of seven previously deposited traces are depicted for convenience, although this is for illustrative purposes only and the existing workpiece may have considerably more traces built up below or behind the portion shown. Furthermore, for clarity in the line drawings of FIG. 3A, the traces are shown as being distinct from one another. In practice, each of the subsequent molten traces deforms into continuous contact into the other traces adjacent and below, so the actual appearance, if one were to cross-section the workpiece, would be a more or less solid block having the overall shape of what is depicted in FIG. 3A. Six traces 302 are shown, as well as a trace 304 behind the area that is next to be printed. Typically, traces 302 will have been formed in previous layers of the build whereas trace 304 will have been deposited, as part of the same print layer, immediately prior to what is about to fill the remaining space above traces 302.

FIG. 3B depicts the path of an extrusion nozzle 310 in laying down a subsequent eighth trace in addition to what was evident. In FIG. 3A. Because of the specific motion of the nozzle 310 prescribed by the present teachings, this new trace 306 is observed to follow what may be described as a somewhat serpentine path. Along a first portion 307 of the extrusion pass, trace 306 roughly aligns with over an outermost trace that was previously laid down. Along a second portion 308, nozzle 310 moves into more inward course, causing trace 306 to be deposited away from the outermost facet of the workpiece and more against previous trace 304. As a latter portion 309 is traversed, nozzle 310 again moves outward so that trace 306 again aligns with the outer surface contour of the workpiece. In FIG. 3B, it may be observed that not all of the volume that was available to be filled as was evident in FIG. 3A has been covered by the passage of extruder nozzle 310 and deposition of trace 306. In FIG. 3B, along portions 307 and 309, there is some remaining space between traces 306 and 304. Over portion 308, trace 306 aligns more inwardly, leaving an unprinted open space facing the plane of outer surface 301.

The disposition of these remaining open spaces is explained in FIG. 3C. In FIG. 3C, it is evident that a second extruder nozzle 312 has passed over the area to be printed and deposited a trace of extruded material 316, which may be of a different material, color or texture than trace 306. While depositing trace 316, nozzle 312 is moved in a pattern exactly complementary to the path that was taken by nozzle 310. Trace 316 fills the voids that were left on either side of trace 306 with a second extrudate. The net effect, shown in FIG. 3C, is that the workpiece will be essentially solidly filled and that the outer surface of the workpiece will be formed by trace 306 along portions 307 and 309 and by trace 316 along portion 308. It is particularly advantageous in this approach that the extruder nozzles are able to move fairly continuously and more or less linearly and yet allow for fast interchange of high spatial frequency at the surface of the object. Furthermore, this is accomplished without significantly weakening the structure and without high incidence of switching between extruders. As mentioned before, extruder switching is time consuming and can introduce unwanted effects. As yet another advantage, the outer surface of the workpiece formed in this manner has a very well controlled contour and surface texture. Being formed from the sides of an extrusion traces, it is not subject to the chatter, material buildup and other telltale disturbances depicted in FIG. 2C.

Figure 4A:
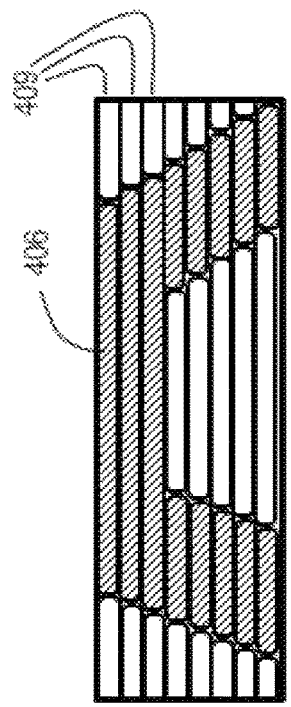
FIGS. 4A-4C show the formation of a graphic feature on a surface in accordance with the present teachings.
Figure 4B:
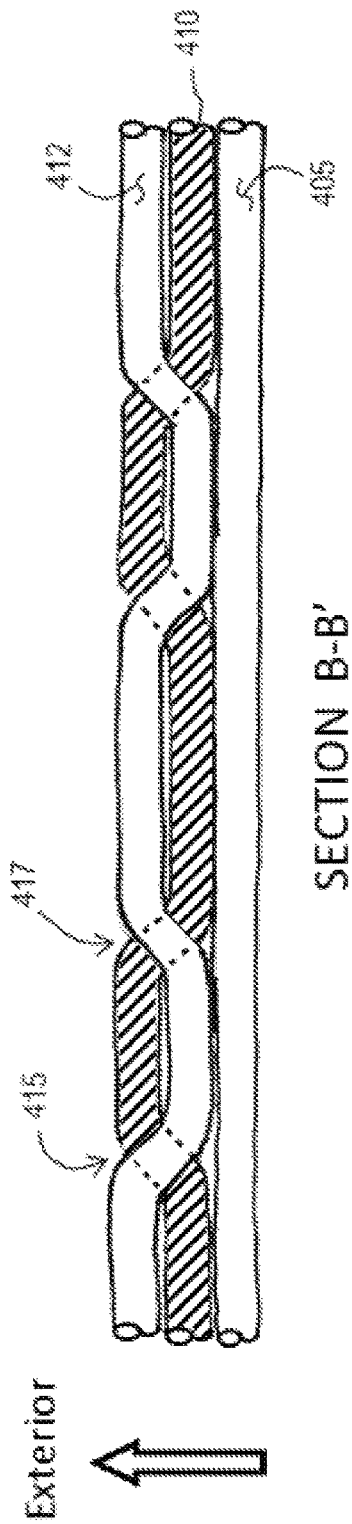
Figure 4C:
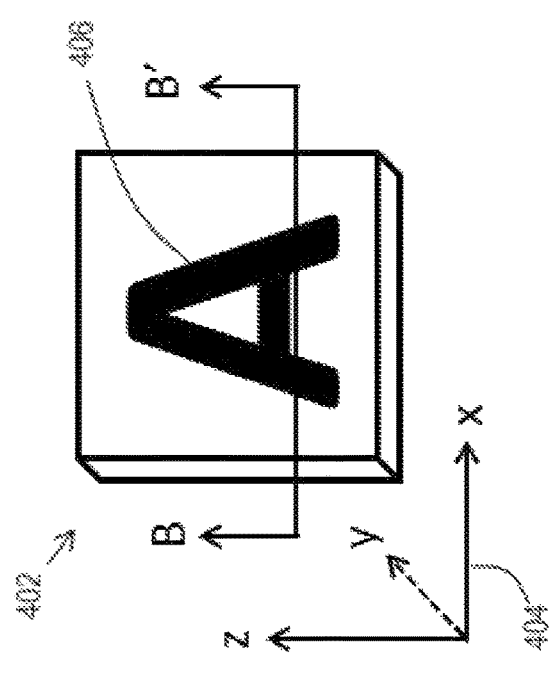

FIGS. 4A-4C of the drawings depict the appearance of a graphic feature that has been formed on the surface of an object in accordance with the present teachings. FIGS. 4A-4C may be usefully contrasted with the prior art construction depicted in FIGS. 2A-2C. In FIG. 4A, a portion of workpiece 402 is shown to have been created having a graphic feature 406. This portion may constitute part or all of a multiple extrusion surface region on an object where traces from multiple extruders are applied in alternating intervals to form the surface of the object. A set of reference axes 404 are provided as a legend to show the directions in which the object or workpiece 402 was oriented on the build plate. Note that, based on the orientation, the workpiece 402 was built vertically, that is, with the earlier layers of the build starting at the bottom of the image shown in FIG. 4A, and then working towards the base of the letter 'A' and then upwards. A cross-section of workpiece 402, built in accordance with the present teachings, is shown in FIG. 4B.

In FIG. 4B, the plane of the drawing parallels the plane of a build layer and the build elevation axis would extend normal to the plane of the drawing. Trace 405 and any underlying layers of traces are actually vertical walls in the construction of the finished object, so if there are other layers below trace 405 as shown in section B-B', these would be merely adding to the inward thickness of the wall of the printed object. The overall wall thickness of the three traces 405, 410, 412 combined may be around 1.8 to 2.0 mm when a 0.5 mm nozzle is used. Trace 405 is analogous to trace 304 introduced in FIG. 3A and its presence is optional, but preferable for greater wall strength and opacity. The view of FIG. 4B is comparable to FIG. 3C as observed from directly above the workpiece. For clarity of description, the three traces are drawn with slight gaps between parallel traces. In reality, these traces substantially adhere and meld with one another to become a solid structure having little or no void space.

In FIG. 4B, the upper two traces 410 and 412 determine the outer shape and appearance of the finished object. Considering FIG. 4B from left to right and taking the outer surface of the object is being towards the top of the sketch, one may observe that trace 412 is initially present at the outermost surface of the object until crossover point 415. At crossover point 415, the path of trace 412 diverts somewhat more interiorly and effectively 'submerges' behind trace 410. Correspondingly at this same point 415, trace 410 is formed to move from a position of being printed behind trace 412 and to emerge or surface for a distance until reaching point 417 at which point trace 410 again submerges and trace 412 reemerges. If the trace 410 is taken to be the darkened or black color depicted by the graphic feature 406 in FIG. 4A, then it is evident that the pattern formed in FIG. 4B would be essentially a 'light-dark-light-dark-light' pattern that could be used to represent the lower part of the legs of the capital letter 'A'.

FIG. 4C shows the outward appearance of the printed article resulting from techniques taught herein. In particular, FIG. 4C shows a close-up of the workpiece 402 from FIG. 4A so that individual build layers can be observed. This view may be somewhat exaggerated depending on the thickness of the layers and the size of the graphic that is being rendered. Given the build direction, successive layers of the build (that is in the Z-axis) are observed as stacked layers 409 in FIG. 4C. Each layer 409 may comprise traces from both extruders. The lighter portions observed in FIG. 4C correspond to positions at which, in FIG. 4B, trace 412 is the uppermost trace. Where darkened intervals appear within one of the layers 409 shown in FIG. 4C, this corresponds to the surfacing of trace 410 as the uppermost trace in FIG. 4B.

Although FIG. 4C is a line drawing and does not convey the smoothness of the surface, it can at least be noted that this surface is as smooth as any other vertical surface that a given 3D printer is able to create on objects. In the current state of fused filament printing, this outer surface, formed by the sides of successive traces, can be quite fine and appear to have somewhat of a silky texture with a matte finish or with very fine ribs. Correspondingly, graphic feature 406 can be formed to appear flush with or inlaid into the surface of the object. Furthermore, unlike the techniques of the prior art, graphic feature 406 need not be depicted in relief and any traces that would form horizontal or overhanging portions of a letter or other graphic feature are no longer problematic because every trace is supported by underlying previous traces.

Figure 5A:
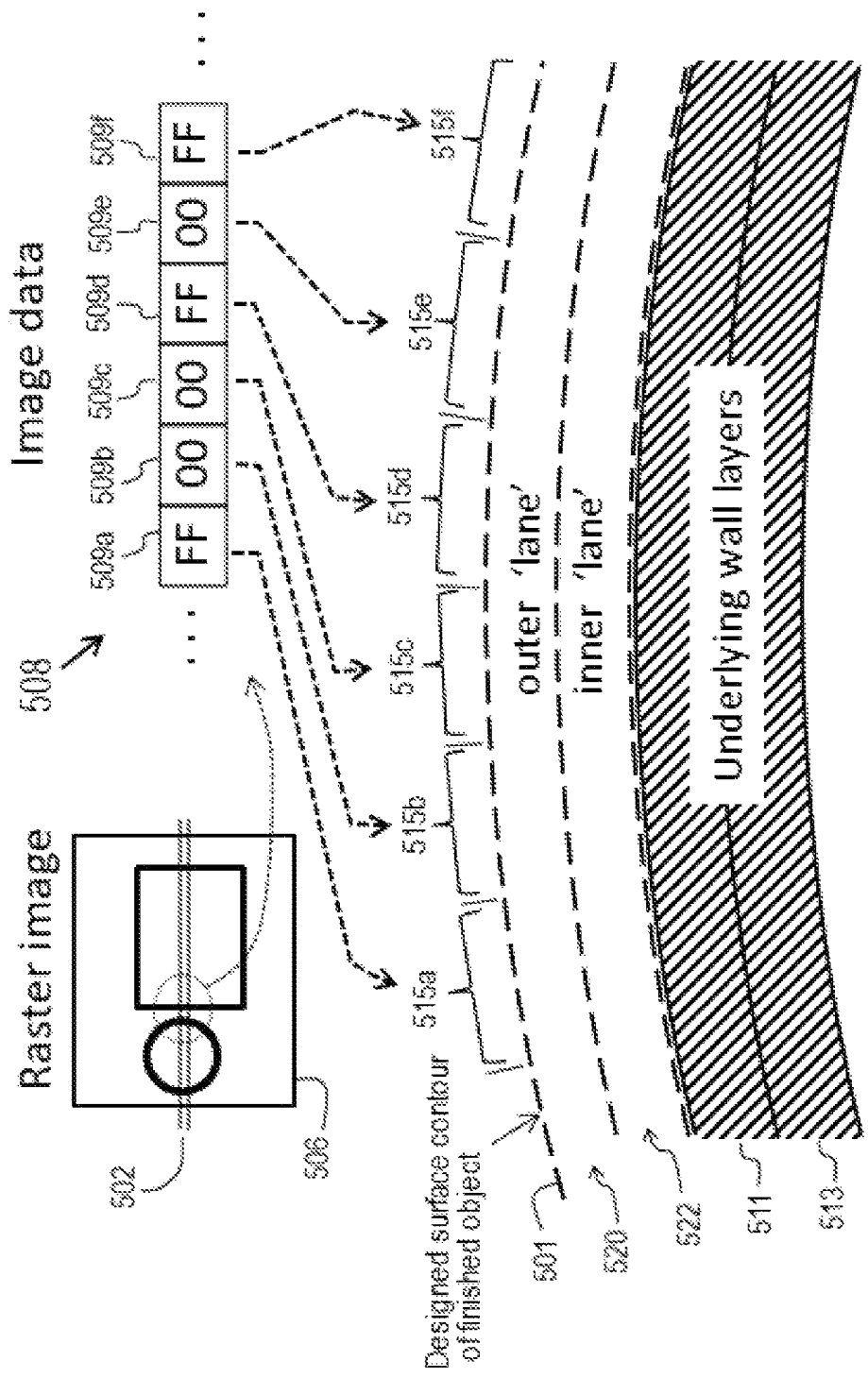
FIGS. 5A-5C diagram the manner in which pattern data is interpreted to affect the surface appearance rendered during 3D printing according to an exemplary embodiment of the present teachings.
Figure 5B:
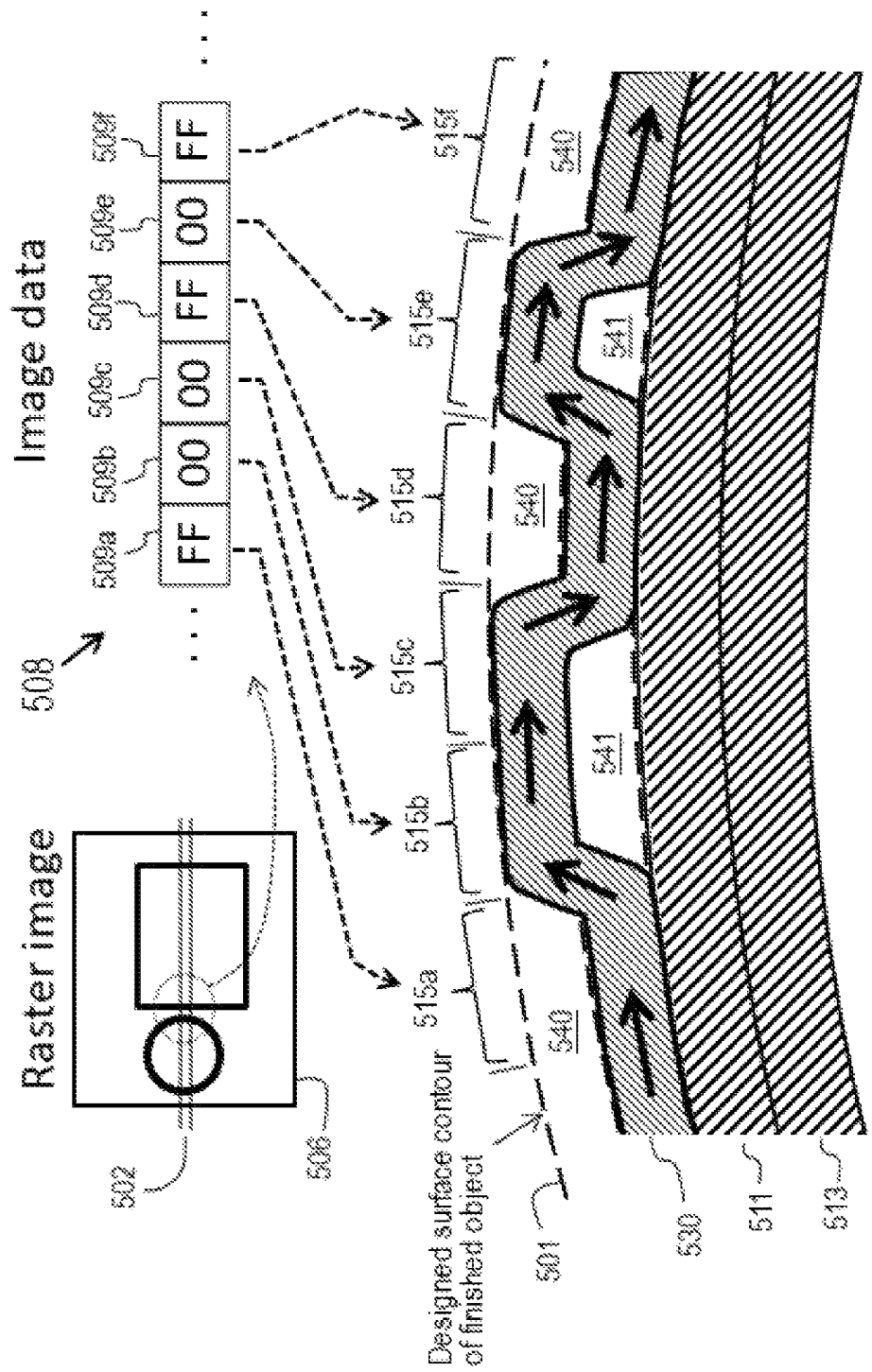
Figure 5C:
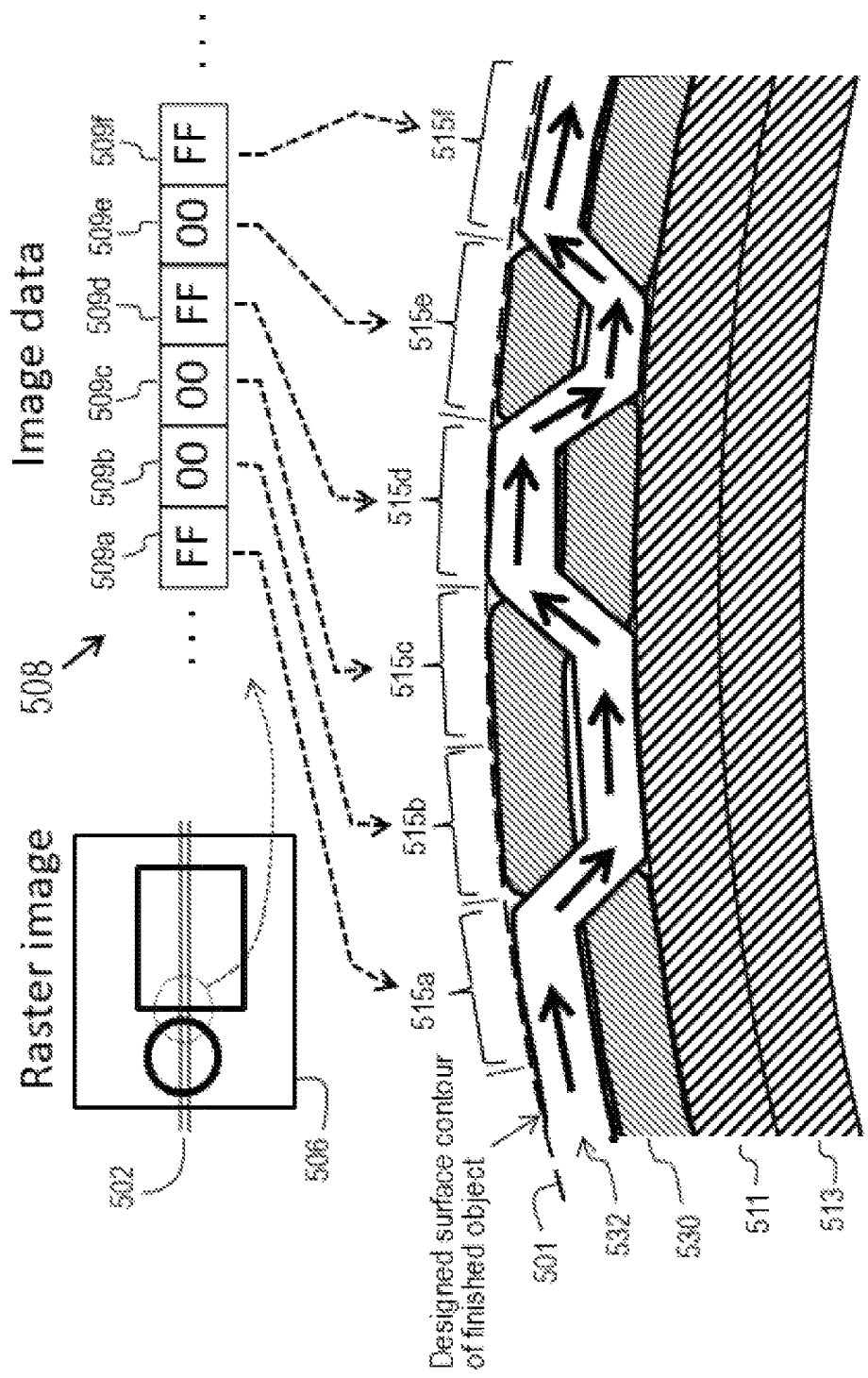

FIGS. 5A through 5C show more particularly how pattern data (such as pattern data 154 depicted in FIG. 1 as being stored in memory 152) may be interpreted to control the pattern in which the path of extruder nozzles, and therefore the shape of the extruded traces formed, may be controlled to depict a desired appearance or image on the surface of a 3D printed object. Raster Image 506 may be expressed in the form of a bitmap file, or any of a number of other well-known formats for representing images or letters in a computer system such as a GIF, JPEG, PNG, TIFF files or the like. There are also font files for depicting different character sets, whether in an inherently rasterized format or in a metafile description that enables rendering into a raster memory space. Raster format refers to establishing a 2D array of pixel values, each addressable by a row number and column number. In practice, any form of image description suffices as long as a determination can be made as to whether one trace or the other should surface at a particular position on an object surface.

For Illustrative purposes, a particular horizontal row 502 of pixels through the image 506 is shown to be analyzed within the image and interpreted for controlling a layer of extrusion in the course of forming a 3D printed workpiece. What is next described will be repeated for other rows of the image as applied to other layers of the build, resulting in the complete image 506 affecting the appearance of the surface of the finished workpiece.

A further subset of data taken from row of pixels 502 is depicted in pattern data subset 508 wherein a series of sequential pixels 509a-509f are shown to have values either "FF", representing a white pixel, or "00", representing a dark pixel. Of course, this is a very simple single-byte-per-pixel example for illustrative purposes only, and bitmap pixel values are often represented as multi-byte RGB values, palette indices or In other forms. Furthermore, there are any number of ways to convert arbitrary pixel values to a determination as to whether one or the other of the extrude traces should surface on the workpiece at the position that corresponds to the pixel location in the graphic. The determination may be based on any aspect of pixel data values, such as the state of a single bit, specific values or thresholds applied to integer values, calculations of brightness or color attributes (hue, tint, saturation) from multiple values (RGB or CMYK), level of a particular color component, an alpha or transparency value, etc.

For forming the machine commands that will be instructing a 3D printer to build the object, it is often necessary for a designer to understand how each pixel in raster image 506 corresponds to a location on the surface of the 3D object that is being constructed. This correspondence may be established by program logic in the course of assembling G-code instructions or may be set more interactively by an end user using a 3D modeling or visualization application (if adapted in view of the present teachings) running on computer 140. Where a raster image is to be rendered as a feature on a particular portion of an object, such as a designated multiple extrusion surface region, several points of correspondence may be needed to unambiguously establish the position, orientation and scaling of the graphically-controlled feature on the object's surface. For relatively simple shapes, such as a cylindrical shape completely wrapped by a graphic feature or a flat rectangular surface, relatively few points are needed to enable mapping from pattern data to point-in-build or point-along-contour. The correspondence between an pattern data value and a position on an object's surface may or may not be explicitly selected by, or known to, a designer. The correspondence may be inherent, implied or even completely arbitrary, particularly where an object's entire surface is a multiple extrusion surface region and the graphic pattern need only be self-consistent within the build but otherwise has no required orientation relative to the object. An example would be a basket-weave pattern applied to the surface of pall.

Accordingly, in FIG. 5A, it can be seen that the first pixel 509*a* in pattern data subset 508 corresponds to a first position 515*a* along the designed surface contour 501 of the finished object. As mentioned earlier, designed surface contour 501 will have been derived by determining where a hypothetical plane parallel to the build plate surface intersects with mathematical components in an object design description for the given object. The lower part of Figure SA depicts the successive walls that form the surface and superficial structure of an arbitrary object. The uppermost dotted line represents the designed surface contour 501 for the object, that is, the intended location of the outer surface once the printing is finished.

Traces that may have already been printed just prior to printing the outside surface are represented by trace layers 511 and 513 (shown crosshatched). In practice, there may be considerably more underlying trace layers to build a thicker wall or to even build a fully solid object. Alternatively, the entire object wall can be formed thinly by just traces 530, 532 (introduced below), optionally excluding trace layers 511 and 513. The other dotted lines in the lower part of Figure SA are intended to show potential positions or 'lanes' for subsequent traces that will define the outer appearance of the finished object. Outermost lane 520 is the position at which a trace will essentially form the surface of the finished object and conform to the intended surface contour 501. Outermost lane 520 is a first candidate toolpath along which a nozzle could be directed to deposit a trace that would conform to the designed surface contour 501. Further inboard from lane 520, lane 522 depicts an alternative path along which a trace may be deposited such that it fits behind a trace in lane 520. A trace placed here does not form the surface of the object but is displaced approximately one nominal extrusion width away from the surface of the object. Lane 522 constitutes a second toolpath that a nozzle could follow and resulting extruded trace would be parallel to, yet spaced from, the designed surface contour. The candidate toolpaths are designed so either one or the other of the nozzle-extruded traces will form the outermost surface of the object at a given interval along its surface contour.

The allocated widths of lanes 520, 522 correspond to the nominal width of the extrusion traces deposited by the extrusion nozzles. A typical overall trace width for a 0.4 mm nozzle is about around 0.6 mm when the height for each build layer is set to 0.2 mm and the extrusion rate (amount of material discharged per linear distance travelled) is properly adjusted. Thus, in cross-section, a typical extruded trace is flattened out to about a 3:1 aspect ratio and has somewhat rounded or bulging sides. To assure good fusing between traces deposited side-by-side, the toolpaths of the depositing nozzle(s) may be offset by somewhat less than 0.6 mm—such as 0.55 mm—to assure that the bulging side parts meld together, but not so much as to exceed the volume available for the trace. The nominal trace width (or trace spacing) is said to be around 0.55 mm in this instance—roughly equal to or slightly less than a measured overall trace width—and would likely be similar among multiple nozzles on the same machine operating under a similar set of parameters. The nominal trace width may also be considered as an approximate, average or estimated trace width, considering that actual depositing trace width and geometry may vary somewhat with conditions such as filament variations, ambient temperatures, heating block temperature swings, workpiece thermal expansion, etc.

The value of pixel pattern data element 509*b* will determine which of the two traces from the extruders will be present at the surface of the object at the location on the surface of the object 515*b*. Likewise, data for pixels 509*c*-509*f* correspond to positions on the surface of the object, 515*c* through 515*f*. Where the pattern data for a pixel represents a first color or a first extrusion material, the corresponding nozzle for the first extrusion material will be directed to follow along lane 520 and as it passes over that portion of the surface 515*a*. This will be made more clear with reference to FIG. 58.

In FIG. 5l, a first trace 530 is shown to have been deposited (in the manner described earlier in FIG. 3B) by the passing of a nozzle that is laying down a first extrusion trace in a particular pattern conforming to the indications of the progressive sequence of pixels in the pattern data subset 508. In particular, it can be seen that trace 530 aligns with lane 522 as it passes by a first position 515*a* along the designed surface contour 501. This choice of lane 522 over lane 520 is in response to the fact that the value at 509*a* is "FF" which corresponds to another extruder's material being desired at the surface of the object at that position. As the extruder that is depositing trace 530 approaches a different position 515*b* of the surface, it can be seen by pixel value 509*b* that the output of the active extruder is desired to form the outer surface 501 of the finished object at that position. Therefore, the path of the nozzle extruding trace 530 shifts outward and follows along the path of lane 520 throughout its travel through portions 515*b* and 515*c*. In response to the value evident in data elements 509*d-f*, the nozzle depositing trace 530 moves back inward and follows trace lane 522 for a distance, then moves outward again while passing by portion 515*e*, and again submerges as it passes by portion 515*f* of the surface. This leaves a pattern of outward facing voids 540 and inward facing voids 541. These voids are filled by a subsequent nozzle moving in a complementary fashion to the path in which trace 530 was laid down.

In FIG. 5C, a new trace 532 has been laid down by an alternate nozzle in a complementary pattern to that of trace 530. That is to say, wherever one of the pixel data values in pattern data subset 508 indicates a value of "FF" trace 532 will be aligned with the outside surface contour of the finished object. Wherever the pattern data has a value of "00", trace 532 will be formed a distance away from surface contour 501. It can be seen in FIG. 5C that, in forming the outer surface of the object being printed, that traces 530 and 532, which may be of different materials, different colors or different compositions, effectively swap positions between lanes 520 and 522 in order to present either one trace or other while following the outer surface contour of the object and forming the outward appearance of the object at that point. Thus, over a first interval (portion 515a) along designed surface contour 501, trace 532 is at the surface of the object and conforms to the design surface contour, while trace 530 is printed in parallel with design surface contour but spaced away such that trace 532 is interposed between the designed surface contour 501 and trace 530. Over a second interval (comprising portions 515b, 515c) the toolpaths for depositing traces 530 and 532 are transposed, causing trace 530 to surface and to be interposed between the designed surface contour 501 and trace 532. Over a third interval (portion 515d) the situation is again reversed so that trace 532 is present at the surface and is Interposed between the designed surface contour 501 and trace 530.

Referring to FIG. 5B, a composite toolpath assembled for a first nozzle depositing trace 530 would comprise: (1) a segment (or, as necessary, a curved path described by a series of short segments) corresponding to following lane 522 along the first interval (portion 515a); (2) a segment for transitioning from lane 522 to lane 520 at the juncture of portion 515a and 515b; (3) a segment conforming to the designed outer contour along the second interval (portions 515b, 515c); (4) a segment for transitioning from lane 520 to lane 522; (5) a segment corresponding to following lane 522 during the third interval, etc. A similar but complementary composite toolpath over the same three intervals may be assembled to direct the nozzle extruding trace 532, resulting in the path shown in FIG. 5C. The G-code instructions for controlling the nozzles will reflect this sequence of discrete commands to implement the type of pattern shown in FIG. 5C in accordance with the present teachings. In some circumstances, either or both of traces 530, 532 could be printed in the opposite direction (with reversed sequence of segment commands) and achieve equivalent end results and effectiveness.

It should be evident from the depictions in FIGS. 3 and 5 that the toolpaths direct the nozzles or move very directly from their above described positions over a first interval, then a second interval and third interval with little to no extraneous motion and without diverting substantially (such as to perform interior ills or switching extrude nozzles in between intervals) from the vicinity of the object surface there the three intervals are implemented. The nozzles move in a continuous, though serpentine, pattern and, at any given point, adhere to specific ones of the conceptual candidate toolpaths or are involved in direct transitions therebetween. Aside from efficient continuous flow and the resulting desirable surface quality, one consequence of this controlled degree of excursion is that the cumulative distance travelled along the respective composite tool paths are very nearly equal to one another as the outer layers are formed over the multiple extrusion surface region. In forming the multiple extrusion surface region of an object, the consumption of extruded materials tends to be essentially equal between the two or more extruders regardless of the pattern or image being rendered. Furthermore, the cumulative distance travelled over a set of contiguous intervals by any one of the nozzles, including transitions between lanes, will generally be well less than twice the cumulative arc length of the designed contour over the same set of intervals. In contrast, conventional slicing techniques faced with the same demand to intersperse multiple extrusion on a surface will try to treat locations where a color is to appear as separate constructions and may jump in an indeterminate order among them, without regard for the efficient continuity achievable by allowing contrasting traces to run alongside one another, to be transposed at some points and to cross over one another. Conventional techniques may also interrupt the rendering of outside appearance to attend to interior filling tasks. Both of these tendencies of conventional methods result in tool paths that do not exhibit the attributes mentioned above.

Figure 6:
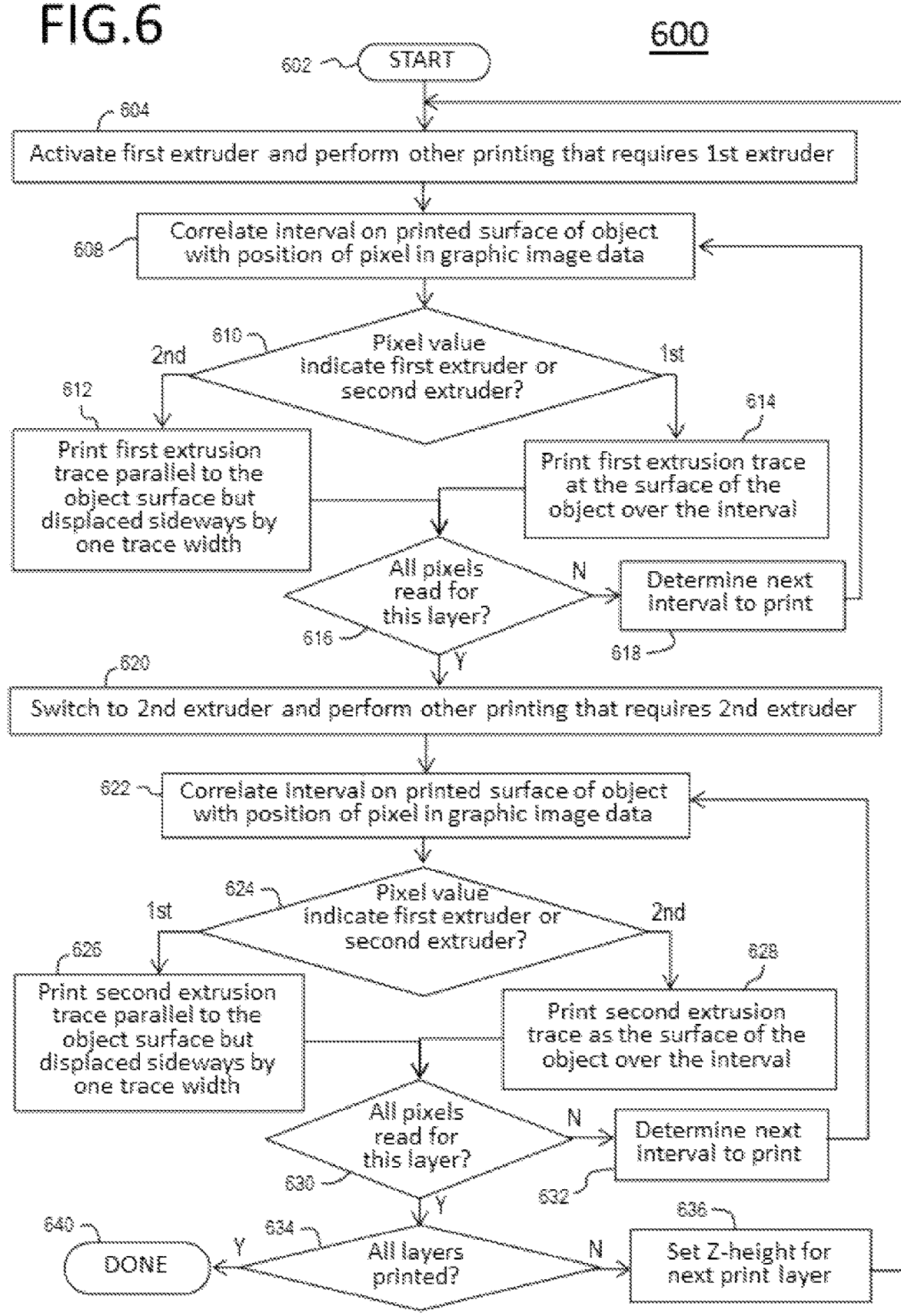
FIG. 6 is a flowchart depicting an example process by which graphic pattern data may be converted into motion control commands for a 3D printer in accordance with an exemplary embodiment of the present teachings.

FIG. 6 is a flowchart describing a process 600, in accordance with a preferred embodiment, for building a 3D object with a dual extrusion 3D printer. More particularly, process 600 provides for controlling dual extruders in response to pattern data such that the outer surface of the object is formed in a specific pattern of interchanging traces between the two extruders. The multiple extruders may be configured to extrude different colors, different materials, different textures or compositions, etc.

Process 600 may be expressed or implemented in G-code and may be simulated or modeled in a master computer 140 beforehand for the purpose of generating G-code instructions that cause a 3D printer to execute the recited steps at build time. Where the steps described below refer to acts such as printing or switching extruders, this is equivalent to creating a series of G-code instructions that express those specific actions and appending them to a cumulative file of such G-code instructions. That is why the steps in process 600 read as if they were being executed by the 3D printer itself when in fact process 600 is more likely executed in master computer 140 in advance of the actual build.

Although pixel values in rasterized image data are shown by way of example, the determination as to whether some portion of the surface of an object is to be formed by either one or the other of the extruders may be determined algorithmically or in some manner other than working purely from a rasterized image. All that is needed is some way of making a distinct determination as to use one nozzle or another for any given point on the graphic area on a surface of a workpiece object where this technique is to be applied. The present teachings are not limited to patterns expressed as purely rasterized image data. As described herein, pattern data can encompass any way of calculating a binary value based on position in the workpiece, such as by modulo operations or other mathematical functions applied to the 3D coordinates of the given point or to related positional variables. Any other means may be used for arriving at a determination of whether one or the other nozzle should conform to the contour of the finished object at any given point on the surface.

Flowchart 600 commences in step 602 upon the beginning of at least a portion of the construction of an object upon which the present teachings may be used. It is acknowledged that there may be many other well-known preparatory steps implied by step 602, such as warming the build plate or the heating blocks to temperature and otherwise getting the machine ready for building the workpiece. There may also be portions of the workpiece below a point where the present teachings are applicable, such as the lower layers of a coffee cup below where a graphic feature is to appear on the side of the cup.

Following the commencement of this process in step 602 and completion of the above acknowledged peripheral activities or previous build layers, step 604 is undertaken to activate the first of the two extruders, if it does not happen to be already active in the course of the build. Step 604 involves driving extruder drive 104a to feed nozzle 110a and printing any other portions of the workpiece that are designed to be performed with this nozzle while the workpiece is at the current Z-axis elevation or build layer.

This preparatory printing could include, for example, any deeper walls of extrusion traces behind the two outer traces, such as trace layers 511,513 shown in FIG. 5A. Trace 304 in FIG. 3A is another good example of a trace that is printed at the same elevation or build layer and before traces 306, 316 are then printed to define the outside of the object. It is not imperative that innermost traces like trace 304 precede formation of the outer traces 306 and 316 but it is generally advantageous for minimizing the number of extruder switchovers in the course of a build.

With property designed sequencing of instructions (as a variation on process 600) It may be possible to act in an efficient alternating fashion as follows. A first extruder nozzle performs all of its non-contour-following structural builds for a given first layer and then lays down an outer trace such as trace 306 for that same build layer. After this, the printer may switch to a second extruder so that it deposits all of its traces necessary for that same first layer, including laying down a complementary outer trace analogous to trace 316. The workpiece elevation is then incremented to a second build layer. At that second layer, the still-active second extruder performs all requisite printing, including Its outer trace 316 for that second layer. While remaining at the second build layer, the printer then switches back to the first nozzle, prints the remainder of the layer, and then the Z-axis elevation is again changed to reach a third build layer. The first nozzle continues to print all that is required of it for the third layer, including an outer trace 316, and the above process repeats. By coordinating in this manner, the 3D printer need only switch extruders once per build layer, even though each layer comprises traces from both extruders. In other words, the extruder switching occurs once per elevation change, rather than twice.

Returning to FIG. 6, step 604 involves the first extruder becoming active and performing all the extrusion steps it needs to for that given layer of the build other than the surface-related outer trace instructions that will follow in accordance with the present teachings. After completing step 604, execution moves to step 608 addressing the necessary correlation of an interval on the printed surface of the object with the position of a pixel in graphic pattern data. This relates to the concepts that were described in conjunction with FIGS. 5A through 5C, namely that of extracting a portion of raster pattern data into an pattern data subset 508 and establishing which pixel in the pattern data subset 508 corresponds to what portion of the surface of the object.

In practice, this mapping is the responsibility of the designer of the object being printed. For example, a designer must decide where a graphic feature is to be rendered on the surface of an object being built, such as a coffee cup. In such an example, there would necessarily be an aspect of the design that determines how many layers are printed before reaching the start of the graphic feature, how large the graphic feature should appear and where the graphic feature is aligned radially around the surface of the cup, such as at a particular angular displacement from where the handle might be. This is entirely up to a designer or a programmer to establish. Whether by using interactive design tools or by writing software, it is necessary, when printing a graphic at a specific position on an object, for there to be some established correspondence between a pixel in the pattern data and what portion of an object's final surface will be affected by the value of the pixel at that location in the pattern data.

Step 608 may correspond to simply a 'look up' of data by, for example, subdividing the outer surface of the desired finished object contour into equal linear or angular measures, and simply counting those to index into the raster pattern data. As a simple example, suppose that the raster pattern data is to wrap completely around a cylindrical object such as a coffee cup. In this case, the pattern data accounts for the surface appearance across the entire circumference of the object. If the raster pattern data is 360 pixels wide, then each pixel would represent one degree of angular measure along the outside of the cylindrical object. In software then, a loop may be coded that increases an angle variable in one degree increments while also incrementing a column number by which to look up a pixel value in the raster image. At each increment, the motor movements will be directed to travel one degree further along the arc of the workpiece contour and at the same time a corresponding pixel in a row of the raster image will be selected as the determining value as to whether a given extruder needs to travel the outer lane 520 or the inner lane 522 while passing along that arc.

Once the appropriate pixel defining a printed surface of the object is identified in step 608, the specific value of that pixel in the raster image is assessed in step 610. If, in step 610, it is determined that the pixel value corresponds to having the first extruder's output present at the surface of the object, then step 614 is undertaken to position the first extrusion trace at the surface of the object over that interval. This corresponds to what was described in FIG. 5B, where it was determined that pixel value at 509b Indicated that trace 530 was to form the surface of the object and conform to the surface contour 501 over portion 515b. So, in step 614 of process 600, the first extrusion trace is printed at the surface of the object over the interval that was referred to in step 608. Alternatively, if, in step 610, it is determined that the second extruder is to form the outer surface of the object along that portion, then the first extrusion trace that is currently being printed is printed parallel to the object surface but displaced 'inward' by one trace width. This corresponds to the passage of trace 530 in FIG. 58, where trace 530 aligns with lane 522 for a distance in response to image pixel data 509a indicating an "FF" value. Trace 530 remains submerged over the portion of the surface 515a.

Regardless of whether step 612 or 614 has been performed, execution then moves to step 616 to determine whether all the pixels from the row of raster pattern data have been read for that given layer of the build. In practice, this step may not necessarily take the form of an 'if then' statement. In software, it may also be effectively executed by a 'for-next' loop or 'do-while' loop as is well-known. If, in step 616, it is determined that all pixels for the currently printing layer and involving the first extruder have not yet been printed, then execution moves to step 618 to examine the next interval that needs to be printed, to look up the corresponding pixel position in the graphic pattern data and to extract the value of that pixel data to again determine whether step 612 or 614 are to be executed over that portion of the extrusion process. Referring to the earlier example of angular intervals along a cylindrical object, this would correspond to incrementing to the next one degree interval and also incrementing to the next adjacent column in the graphic pattern data to extract its pixel value.

Steps 608 through 618 are executed until the first extruder has performed all of the outer-surface-defining printing that is called for in accordance with the present technique.

When, in step 616, it is determined that all of the first extruder's graphic feature pixels have been rendered for this layer, then a switch to activate the second extruder is performed in step 620. This may involve inactivating the first extruder, such as by retracting the filament or performing other steps depending on the model of the unit. It is conceivable that some models of fuse filament printers might employ a mechanism of parking print nozzles that are not in use such that they do not move in tandem. If that is the case, in step 620 corresponds to docking the first extruder nozzle and moving to engage the second extruder nozzle and bring it in contact with the workpiece. Step 620 also involves performing any other printing required from the second extruder for that build layer prior to performing the outer-contour-defining portion of the print in accordance with the present teachings. After these other steps are performed in step 620, then execution moves to step 622 to correlate the interval on the surface of the object with the position of the pixel in the graphic pattern data. This takes place as was described for step 608 above.

Once this correlation has been made, then execution proceeds to step 624 to determine whether the value of the corresponding pixel indicates whether the second extruder or the first extruder is to conform to the contour of the finished object along that portion of the surface of the workpiece. If it is determined that the presently printing extruder, namely the second extruder, is to form the outer surface of the workpiece, then execution proceeds to set 628 and the second extrusion trace is printed as the surface of the object over the given interval. This is analogous to the manner which trace 532 in FIG. 5C initially conforms to lane 520 and forms the outer portion of the object by conforming to outline 501 over the interval 515*a*. Alternatively, if, in step 624, it is determined that the pixel value from the graphic pattern data corresponds to using the first extruder over that interval that is being printed, then execution proceeds to step 626 wherein the currently printing second extrusion trace is printed parallel to the object surface but displaced away from the surface by one trace width. This corresponds to having trace 532 in FIG. 5C move in alignment with lane 522 over the intervals 515*b*, 515*c* responsive to the pattern data indicating "00".

Regardless of whether step 626 or step 628 has been performed, the process continues on to step 630 wherein, analogously to step 616, it is determined whether all the pixels have been read for the current layer. If not, then execution proceeds to step 632 (analogous to step 618) to move further along the surface of the object, to determine a corresponding pixel in the graphic pattern data, and to process the path of the second extruder accordingly by the action of steps 624 and either 626 or 628. In other words, steps 622 through 632 are iterated until all the pixels in the graphic pattern data have been processed by the second extruder. In step 634, a determination is made as to whether all of the layers of the object in the workpiece have been printed (or at least all the layers that employ graphic feature rendering in accordance the present teachings) if not, then execution proceeds to step 36 to adjust the height of the workpiece, such as by causing Z-axis motor 112*c* to turn lead screw 114*c* and cause build plate 120 to move one increment further away from nozzles 110*a* and 110*b*. Then the majority of process 600 is again executed so that both the first and second extruders perform their desired actions for the next layer of the build. If, in step 634, it is determined that all layers have been printed, then the printing process (or at least the graphic feature portion) concludes in step 640. At this point, the graphic-depicting layers in accordance with the present teachings have been incorporated in the workpiece.

Figure 7:
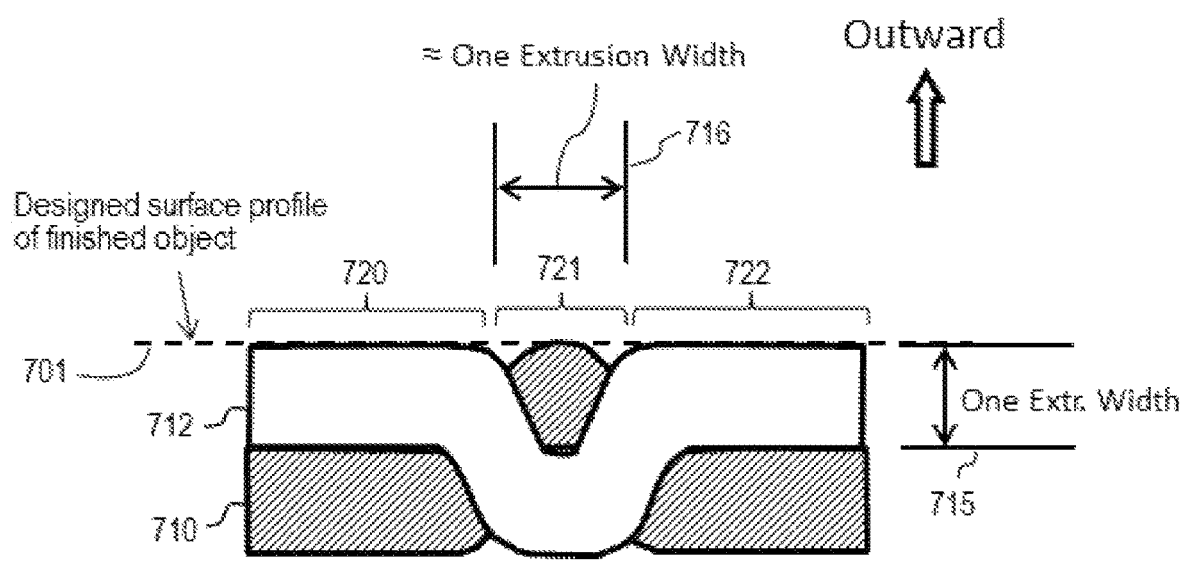
FIG. 7 depicts the manner in which two extruded traces may be transposed for a short distance to render a fine resolution feature on the surface of a printed object in accordance with an exemplary embodiment of the present teachings.

FIG. 7 depicts the point of crossover between two traces in a simplified fashion, but is comparable to FIG. 5C. Even though underlying walls in the same build layer are excluded from this drawing for simplicity, FIG. 7 serves to illustrate the degree of fine detail achievable using the present teachings for depicting graphics letters and numbers on the surface of a 3D printed object. The designed outer contour 701 of an object is shown as a dotted line. The nominal width 715 of an extrusion trace is identified, which is typically about 0.60 mm when a nozzle of 0.5 mm diameter is used but also depends on extrusion rates, build layer height and other factors.

In FIG. 7A, first trace 712 is observed to follow the outer contour 701 over a first interval 720, to be printed slightly away from the outer contour of the object over second interval 721, and then again meet the outer contour 701 over a third interval 722. In exactly complementary fashion, a second trace 710 is observed to be submerged behind trace 712 over interval 720, to surface over interval 721, and to again re-submerge along interval 722. FIG. 7 mainly shows, that even using fairly conservative angles at which the traces crossover one another, it is possible for the apparent width 716 of trace 710, as it would be seen over interval 721, is on the order of the same as the width 715 of an extrusion trace. In practice, where the width of an extrusion is on the order of 0.6 mm, this means that graphic images on the surface of the 3D printed object using a typical nozzle diameter of 0.5 mm can yield graphic detail (or spatial frequency) on the order of 40-50 dots-per-inch horizontally. In the vertical axis, given a nominal layer thickness for each layer of the build of 0.2 mm, the effective resolution is about 125 dots-per-inch (dpi) in the vertical direction.

It should be kept in mind that FIG. 7 shows an approximate practical minimum over which extrusion trace 710 might submerge, assuming that the two traces fully swap positions. An even smaller presentation of trace 710 may be possible if it does not fully surface, but the spatial frequency with which traces 710 and 712 could be rapidly alternated would still be limited to roughly that shown in FIG. 7. Nonetheless, the present technique is not precluded from enabling the exact positioning of interval 721 to vary more finely, such as to enable a finer degree of positioning of a point at which either trace surfaces or submerges. The fine positioning of such transitions may be comparable to the vertical resolution of 125 dots-per-inch. Thus, relatively fine details can still be rendered using the present teachings even though the minimum line thickness in the horizontal axis may be limited.

As one example, a solid colored circle may be depicted graphically on the surface of the workpiece and the edges of the circle may be very smooth and precisely placed, rather than jagged, effectively with at least the same finesse that would be achievable with a symmetrical 125 dpi resolution. If the circle needed to be drawn as an outline only, the minimum line thickness for the outline would be around 0.6 mm, but its contour could still be rendered quite smoothly.

In accordance with an exemplary embodiment of the present teachings, a method for creating the G-code based on input from graphic pattern data is to read the graphic pattern data, or calculate the graphic pattern data algorithmically, in a software executable such as an application written in 'C' source language and executing on the master computer 140, such as a PC. The executable may directly generate G-code that, in turn, specifies the motor control commands for creating finished objects. This approach makes it fairly simple to incorporate text or graphics into the surface of an object especially where the remainder of the object is also being produced directly in this manner rather than through the typical process of using a 3-D modeling application and a slicer application.

Nonetheless, it is contemplated that existing modeling and slicing software tools could be modified to allow an end-user to project or superimpose any desired bitmap or raster, including text that could be freely typed in from the application's interface, onto the surface of an object that is being designed. In accordance with the present teachings, it may be unnecessary to form or manipulate text or graphic objects in a 3D modeling environment in the course of defining and building an object with multi-extrusion surface features. Furthermore, in accordance with the present teachings, it may be unnecessary to depict text or graphic objects in a tessellated description of the surface of an object in the course of defining and building an object having multi-extrusion surface features. Some forms of object surface description are known which include surface color or texture, including Virtual Reality Markup Language (VRML) and so called PLY, 3DS and ZPR file formats. A software tool may be adapted to extract the surface appearance information from such descriptions and generate toolpath commands that cause multiple extruders to vary the surface appearance of a constructed object as described herein. In other words, a tool path computer, such as computer 140, may receive as input a design description of an objects shape and separately receive or apply pattern data to the designed object without reverting to the tool or modeling environment that created the design description. This practice may be referred to as a 'late binding' of surface features to otherwise already complete design descriptions, offering a user the ability to freely change surface graphics or textures as superimposed on an existing design. The tool path computer will generate G-code commands implementing the overall shape of the designed object while injecting the necessary tool path nuances to render the pattern on the surface of the object. In contrast to conventional approaches, the present teachings allow for the overall design of the shape of an object to originate from a different source than a patterned texture or graphic feature to be applied to the surface of the object. For example, a user may download from a website the general shape of a tea pot in the form of an STL or SCAD file and then select a decorative pattern from a different site (or create their own) and have the tool path computer generate an altered sequence of motion control commands that reflect the influence of both inputs.

Figure 8:
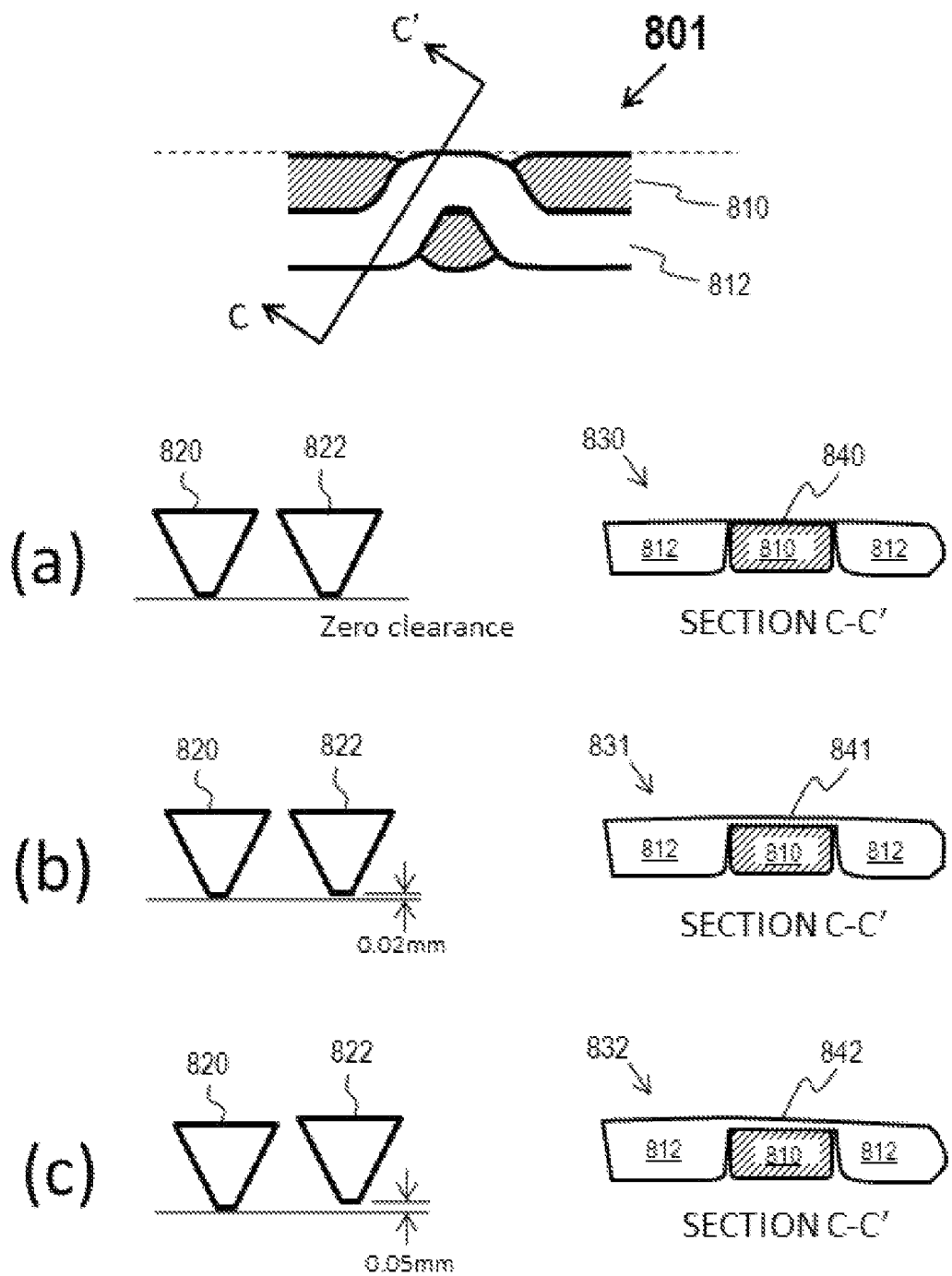
FIG. 8 depicts a manner in which relative nozzle heights in a dual-extrusion printer can affect the shape of one extruded trace that is deposited to overlap another extrusion trace.

FIG. 8 shows a pair of traces 810 and 812 crossing over one another in accordance with the present teachings and in a similar fashion as was depicted in FIG. 7. The portion of the traces 801 is shown to be cross-section along line indicated as C-C' and then image obtained from the cross-section C-C' is depicted in a variety of slightly differing circumstances. Each of the instances (a)-(c) shown in FIG. 8 is intended to demonstrate the effect of having the extruder nozzles for the respective extruders for traces 810 and 812 at slightly different elevations in the Z-axis direction. In scenario (a) it is shown that the discharge tips of nozzle 820 and nozzle 822 as viewed from the side are at substantially the same elevation relative to the plane of a build plate or workpiece. When two traces are interleaved in accordance with the present teachings, the effect is similar to what is shown in cross-section 830. In cross-section 830, the cross-hatch section corresponds to trace 810 that has been deposited before trace 812. The two white lobes on either side of this section are the trace 812 formed by the subsequent passage of nozzle 822. In section 830, it can be seen that there is essentially no clearance below the nozzle 822 as it passes over trace 810 and so the trace 812 thickness as indicated at portion 840 is essentially zero, so that trace 812 may be pinched off by pressure against trace 810, or a thin sheet or thread of extrudate may stretch over or displace into trace 810. Even if the rightward lobe of trace 812 as shown in sketch 830 becomes pinched off from the leftward side, this extrude material will nevertheless be held in place by bonding to the surrounding structures above, below and behind it in the final constructed object.

In scenario (b), nozzle 822 is slightly higher in the Z-direction than the tip of nozzle 820. As evident in picture 831, that portion 841 of trace 812 that corresponds to nozzle 822 crossing over tray existing trace 810 allows for some residual thickness of trace 812 to connect between the leftward and rightward lobes as shown in this view. This simply means that the outermost portion of trace 812 that conforms to the surface contour of the object remains connected to the remainder of trace 812 by a thin sheet of material. This may be beneficial to keeping the rightward lobe of trace 812 connected although, as noted before, there are other points of adhesion between this part of the trace and the remainder of the build.

Finally, in scenario (c) a larger offset between the nozzle tips of 820 and 822 are is observed, leading to an even larger margin by which nozzle 822 clears the existing trace 810 and allows for continuity of extruded trace 812 as it crosses over trace 810. FIG. 8 demonstrates one parameter that may be adjusted to achieve desired results in conjunction with the present teachings. The condition depicted in sketch 832 may actually be beneficial in conjunction with the teachings of FIG. 9.

In FIG. 9 a variation is taught wherein a first trace 910 and a second trace 912 or made to cross over one another and to define the outer surface of an object. However trace 910 is moved outward beyond the main surface contour of the object 901 so that, where trace 910 surfaces, it also forms a raised surface or depicts the graphic in relief. For example, trace 912 may be formed of a black extrusion material and trace 910 can be formed of a very light colored white or fluorescent color so that forming the traces as shown in FIG. 9 would result in light colored letters that stand out slightly from the surrounding surface. The extent to which they stand out is freely adjustable between the flush arrangements typified so far in the present teachings and a different situation where trace 910 may considerably step outward at the surface of the nominal contour of the object to depict a raise surface. (The protrusion in a given interval may be considered as an alternate surface contour that roughly parallels the objects nominal contour. This alternate contour may either be expressed as bumps in the designed surface contour evident in the design description of the object or may be superimposed in a 'late binding' application of a surface treatment to an existing object shape.) Where an extreme relief is desired in the graphic or text being depicted in this manner, due consideration must be given to the fact that the trace 910 may protrude far enough to not be supported by underlying previous traces and gravity may cause the trace 910 to sag. One solution to this is to ensure that, where such high degree of protrusion is warranted, that at least one underlying preparatory trace be in place to prop subsequent traces. For example, in the vertical direction, it may be necessary for a highly protruding of trace as depicted in FIG. 9 to be supported by one or two prior traces that progressively ramp between a flush configuration and the full protrusion shown. If it is desired to have an even higher degree of protrusion, then a correspondingly longer ramp-up by lower layers may be necessary to achieve that.

Figure 10:
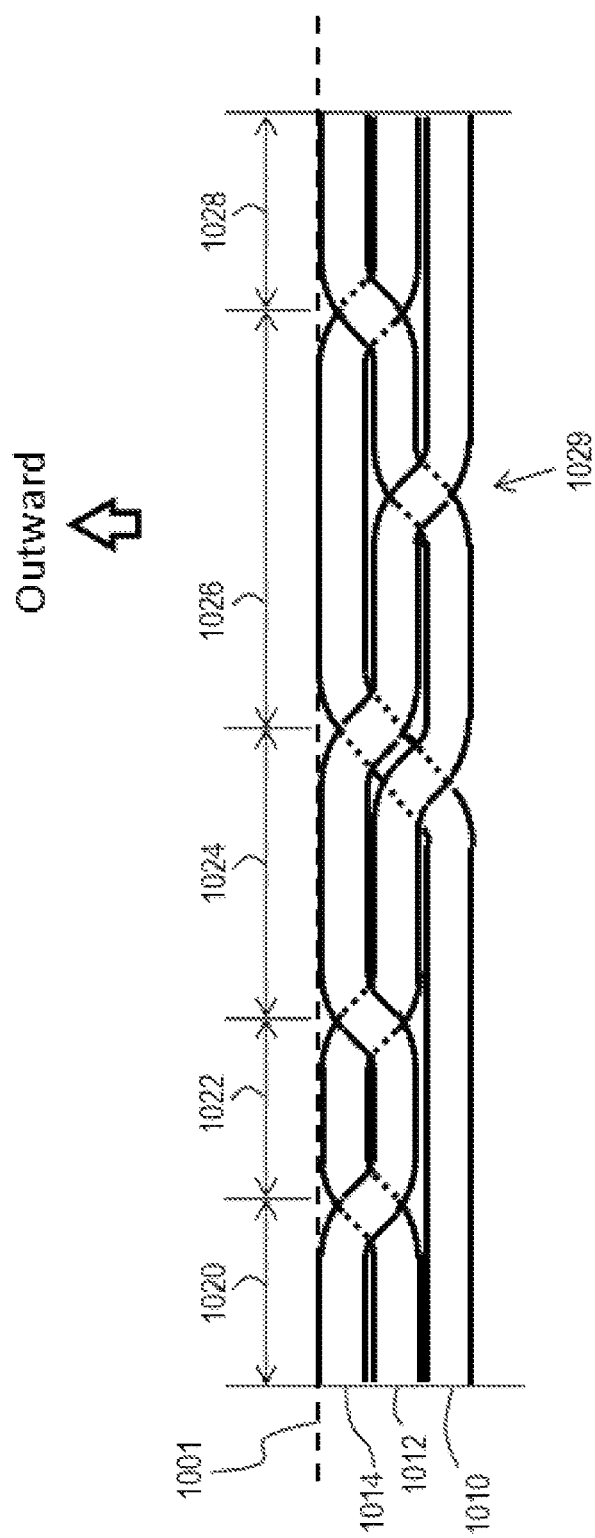
FIG. 10 depicts a variation of the present teachings in which more than two extrusion traces are manipulated to provide a greater variety of surface appearance features on a 3D printed object in accordance with an exemplary embodiment of the present teachings.

In FIG. 10, a technique is described for working with higher numbers of distinct extruded traces—whether differing in color, transparency or material texture—and extending the present teachings to interspersing more than two extrusion sources over a given portion of an object's surface. As with the previous figures, the top of the drawing is construed to be towards the outside of the object being printed. To form this build layer as part of a multiple extrusion surface region, three transposable traces 1010, 1012 and 1014 are, at various intervals, assigned among three candidate lanes or toolpaths. Starting at the far left of the diagram, trace 1010 is shown to be innermost and is separated from the outer surface of the object by traces 1012 and 1014. Over interval 1020, the appearance of trace 1014 will determine the appearance of the outside of the object. In passing from interval 1020 to 1022, the tool paths for the nozzles that deposit trace 1014 and 1012 are transposed such that, over the interval 1022, trace 1012 is at the surface while trace 1014 submerges behind trace 1012. In passing to interval 1024, these two traces again reverse, bringing trace 1014 back to the fore. In transitioning to interval 1026 along the surface of the object, another variation is undertaken wherein both traces 1014 and 1012 are shifted inward and trace 1010 is transitioned to the outermost lane so that it surfaces. In progressing left to right across FIG. 10 through portion 1024, the transitioning to move trace 1010 outward begins with trace 1010 crossing over trace 1012 well in advance of the juncture between 1024 and 1026. This is done to preserve roughly a 45° angle as any trace approaches the point at which it must surface. This recommended angle ensures that, when some nozzles pass over existing traces with little to no clearance, they do so for such a brief duration that the traces continue in pretty much a normal fashion without any pressure build up or excess or insufficient discharge at some points. In practice, after all nozzles have traversed an area that has been printed according to the current teachings (and despite frequent crossover points), the finished surface is essentially as smooth and level as if only a single extruder had been used to solidly fill the area in the conventional manner.

Continuing on from left to right along FIG. 10, trace 1010 determines the appearance of the final printed object over interval 1026 until, at the transition to portion 1028, traces 1010 and 1012 are transposed, meaning trace 1012 comes to the surface and trace 1010 assumes a position in the middle lane. It is not necessary for trace 1010 to return to the innermost position and, in fact, it may be advantageous for trace 1010 to stay in the middle position if, for example, the very next interval causes trace 1010 to again surface. Another interesting facet or point along FIG. 10 is at juncture 1029. At this position, in anticipation of having to surface trace 1012 at interval 1028 trace, 1012 is transposed with trace 1014 well before the outwardly apparent transition between portions 1026 and 1028. The software preparing G-code to implement the superficial layers of a multiple extrusion surface region may take into account the pixel values that corresponding to intervals one or more steps ahead of the currently processed interval.

A greater number of traces, perhaps exhibiting different colors or other characteristics, could be interlaced in this fashion to present readily changing colors on the surface of the 3D printed object at relatively high spatial frequency and with minimal extruder switching at each layer. Yet another variation in the context of FIG. 10 involves utilizing somewhat translucent materials to extrude. Using one or two somewhat translucent traces and varying the depth by which more opaque traces are buried underneath his translucent traces might lead to for example the ability to depict grayscale or other color variations with finer gradation than just the colors presented by the three or more separate extruded materials. For example, if trace 101 is somewhat translucent and traces 1021 and 1014 are of different colors or different translucency, then the transition that occurs at point 1029 might actually be desirably visible as a subtle variation in color within interval 1026.

Figure 11:
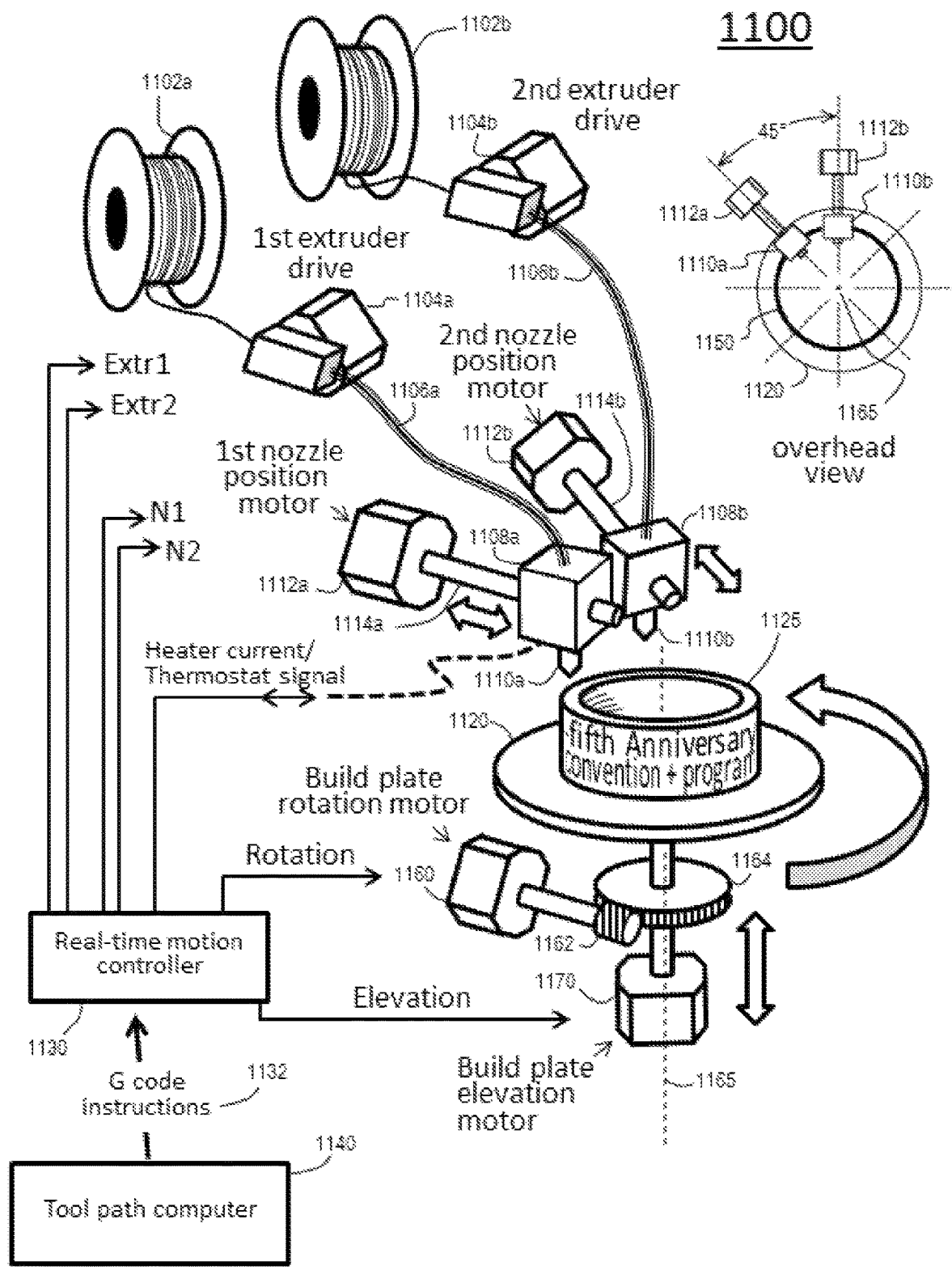
FIG. 11 is a diagram of an alternative motor-driven 3D printing system which applies a rotary motion between a build plate and its extruding nozzles.

FIG. 11 depicts an alternative embodiment in the form of additive manufacturing system 1100, in which many of the components are analogous to those shown and described in connection with FIG. 1. However, in contrast to system 100 described earlier, system 1100 is configured to apply a controlled rotational motion to the build plate and to move the other components, such as extrusion nozzles, in coordination with the rotation to construct objects, especially round or cylindrical objects.

Another characteristic of system 1100 is the decoupling of the motion of two or more extrusion nozzles. In system 100 described earlier, the two extruders were described as moving in concert at all times and remaining in a fixed orientation with respect to one another. Even though the three orthogonal axes of motion provided by earlier system 100 can, with the proper instructions, achieve circular motion of the nozzles over the build plate, the arrangement of system 1100 offers certain advantages in printing speed and simplicity for objects that are roughly cylindrical, exhibit radial symmetry or are otherwise easily described in polar, cylindrical or spherical coordinates. Examples of such objects include bracelets, napkin rings, collars, gears, bushings, bearings, wheels, jar lids, vases, etc. With certain classes of objects upon which surface features are desired to be formed from two or more extruded traces in accordance with the present teachings, especially cylindrical, toroidal or conical objects, or more complex surfaces of rotation (for example, a vase or urn), the system 1100 may allow for multiple extruders to deposit material onto a rotating workpiece simultaneously, albeit at different locations on the workpiece at any given time. This attribute can reduce or eliminate the need for any extruder switching and the various related measures that must normally be exercised to prevent dribbling from an idle extruder from spoiling a workpiece. In addition to improved speed and 'clean' formation of a workpiece, system 1100 enables some workpieces to be constructed spirally, that is, by gradually incrementing the Z-axis elevation of the nozzles over the course of a rotation of the build plate rather than abruptly incrementing the elevation at a particular angle in the rotation. Thus, for many objects fabricated in a dual extruder system constructed as in FIG. 11, both extruders may continuously extrude material at a constant rate throughout the build and generate an object having complex graphic surface features of the type described herein.

In particular, it is advantageous to dispose multiple, independently-controlled extruder nozzles around the center of rotation of the build plate and to arrange the linear axis of motion for each nozzle to align with the rotational axis. (See inset labeled 'overhead view') in this manner, if a tool path for an object is readily describable in terms of a distance 'R' from center of the build plate as a function of angle of rotation 'theta' of the build plate, the action of the motor rotating the build plate can be mapped to angle 'theta' and the motor controlling the nozzle can simply move in response to the value 'R' at the given angle. As the rotating workpiece passes under the respective nozzles each nozzle may independently move to a position where the specific extruded trace from that nozzle needs to be applied.

Referring to FIGS. 5A-5C, if a cylindrical object is being fabricated, the rotary motion of the build plate will cause the workpiece to pass under an extrusion nozzle and, for as long as the nozzle is set at a fixed distance from the center of rotation of the build plate, an extruded trace from the nozzle will naturally be formed in a circular fashion on the build plate or workpiece. If the designed surface contour of the object to be built is circular, of a particular radius 'r' and centered around a center axis of the designed object, then positioning a nozzle at a fixed distance from the center of the rotation of the build plate—the distance being equal to the radius Y minus one half the nominal width of an extruded trace—then the outer side of the extruded trace will closely conform to the designed outer surface of the object. This condition is analogous to aligning the nozzle with lane 520 in FIG. 5A. Moving the nozzle further inward toward the center of build plate rotation by the width of an extrusion trace would correspond to aligning the nozzle with lane 522 in FIG. 5A. Providing a motor 1112a to move the nozzle inward or outward as the workpiece is rotated by the build plate accomplishes a shifting between of the toolpath as different portions of the workpiece pass under the nozzle. The shifting of the nozzle can be controlled based upon an pattern data value corresponding to a specific position on the object surface which, in turn, corresponds to a particular angular position of the build plate. With appropriate coordination of the nozzle position with build plate rotation, a trace may be deposited resembling trace 530 in FIG. 5B.

To accomplish the placement of a complementary trace such as trace 532 as shown in FIG. 5C, another nozzle placed at a different azimuth relative to the first nozzle can be similarly controlled to move inward and outward responsive to the pattern data as the build plate is rotated, but in an opposite 'outward-inward' sense compared to the first nozzle and as delayed by the angular offset between the two nozzles. As an example, assume two nozzles are spaced at 45 degrees around the build plate. A first nozzle has, at a given point on the workpiece, deposited a trace that is conforming to the object contour for one degree of build plate rotation and then moves inward by about one trace width over the next degree of build plate rotation. A short time later, after the build plate has rotated 45 degrees and the same given point on the workpiece comes under the second nozzle, the second nozzle will be moved inward for one degree of build rotation and then move outward during the next degree, responsive to the same pattern data that earlier compelled the first nozzle to move outward and then inward. Over a series of intervals and after both nozzles have acted upon a given point along the workpiece, the resulting two outer traces will resemble FIG. 5C. The two nozzles may also be controlled to form other wall layers (FIG. 5A-511-513) during additional revolutions of the build plate, either before or after depositing the outer traces 530,532. In other machine designs, additional nozzles with separate drives may also be added so that other wall layers (511,513) may be formed in a single pass. Additional nozzles may be added for further variety in an object's outer surface, such as by employing the approach shown in FIG. 10.

In FIG. 11, material for making items is provided in the form of a filament wound on spools 1102a and 1102b, although it will be appreciated that other materials which are not provided as filaments may also be extruded through suitably designed nozzles and deposited in a pattern. The presently explained techniques of using continuous, transposed extrusions to achieve fine details on a surface are equally applicable to, for example, heated viscous solutions or syrups. Other alternative materials that may not as solid filament include slurries, powders, foodstuffs, biological materials, fast curing adhesives, sintered metals, etc. These may be dispensed from reservoirs and discharged or driven forward in a controlled fashion through valves, pistons, rotating augers or pneumatic or hydraulic pressurization.

In the case of filamentous raw materials, such as plastics, filament from spool 1102a is fed into a first motor-driven extruder 1104a. Likewise, in a dual extruder system, filament from spool 1102b is fed into a second motor-driven extruder 1104b. Under control of a motion control computer, such as real-time motion controller 1130, extruders 1104a and 1104b push the filaments through flexible tubes 1106a and 1106b, respectively. Each filament is forcefully fed into its respective heater block 1108a and 1108b. Each of the heater blocks comprises a heating element and a temperature sensing element, such as a thermocouple. As connected to real-time motion controller 130 or a separate temperature controller, heating block temperature may be controlled by sensing actual heating block temperature and sending controlled electrical current through the heating elements to achieve a desired temperature. When driven by force on the filament entering from the top, heater block 1108a discharges material from the bottom at the tip of nozzle 1110a. Likewise, heater block 1106b can extrude material from the tip of nozzle 1110b.

The position of nozzle 1110a relative to the build plate center of rotation 1165 is adjusted by first nozzle position motor 1112a responsive to control signal 'N1' from real-time motion controller 1130. First nozzle position motor 1112a acts upon leadscrew 1114a to cause block 1108a to be driven inward or outward relative to the build plate center of rotation. First nozzle position motor 1112a may be coupled to block 1108a via belts, pulleys, gears, linkages or other means, resulting in substantially inward and outward motion. First nozzle position motor 1112a may be a rotary stepping motor, DC servo, phase resolver or may be a linear motor or galvanometer.

Similarly, second nozzle position motor 1112b may move block 1108b Inward and outward relative to the build plate center of rotation and is subject to the same description for motor 1112a above.

Build plate elevation motor 1170 may be control the elevation (or Z-axis clearance) of the build plate relative to the nozzles. Although FIG. 1100 is highly simplified for clarity, motor 1170 may act upon several lead screws or pulleys to elevate an entire build plate platform while keeping it leveled. The build plate platform could include build plate 1120, rotary shaft bearings for the build plate (not shown), worm gear assembly (comprising worm 1162 and worm wheel 1164) and build plate rotation motor 1160. Alternatively, a common shaft 1172 may be coupled to elevation motor 1170 through a thrust bearing and coupled to a stationary motor 1160 and worm 1162. Using well known techniques, shaft 1172 may be free to slide vertically through worm wheel 1164 yet be coupled (by engaging a key or splines on the shaft) so that the worm wheel can apply torque to turn the build plate 1120 through shaft 1172. Shaft 1172 may be coupled through a thrust bearing to elevation motor 1160 which allows the motor to drive the shaft vertically but allow the shaft to freely rotate under control of the worm wheel. Although not explicitly shown, elevation motor may act through, or include, reduction gears, lead screws, pulleys, cams or the like to accomplish fine control of the vertical shaft position. Such elements are well known and a wide variety of designs would adequately fulfill this role. Thus, motor 1160 and motor 1170 independently control the rotation and elevation of the build plate, respectively.

A workpiece 1125, which is an object being constructed progressively by addition of materials from either or both of spools 102a, 102b, is shown on build plate 1120, though it should be understood that, just before a construction begins, the build plate will generally be blank until the extruders deposit the first layer of traces. In the arrangement shown in FIG. 11, a build will be initiated by driving build plate elevation (Z-axis) motor 1170 such that build plate 1120 is elevated to a point that nearly brings it in contact with nozzles 1110a and 1110b. To form the first layer of a workpiece, first and second nozzle position control motors 1112a,b will be set to initial distances from the center of build plate rotation and build plate rotation motor 11600 may begin rotating the build plate as either or both of the extruder droves 1104a,b actuate to drive material from the nozzles 1110a,b. As the build plate rotates, nozzles 1110a,b may be independently driven toward or away from the build plate center as necessary to deposit materials onto the workpiece in accordance with the designed shape of the object being built.

Build plate rotation need not be unidirectional or of constant rate. Indeed, shapes resembling flower petals, undulating patterns, Lissajous figures and circular saw blades may be readily achieved by careful control of rotation in coordination with the inward-outward positioning of one or more extruder nozzles. Furthermore, a hybrid type of machine may be constructed that uses build plate rotation as in system 1100 while preserving the Cartesian coordinate control of nozzle positions as set forth in system 100. Of course, a tool path calculating computer would likely need to take into account which machine geometry the G-code instructions were intended for, be it system 100, system 1100 or a hybrid thereof. Most conventional machines receive instructions for moving in three orthogonal directions and accommodate for machine-specific parameters, but a rotary-based system may require earlier consideration in calculating tool paths.

Once an initial layer of material has been deposited in this fashion, then Z-axis motor 112 C will generally be directed to turn lead screw 114 C slightly so that build plate 120 moves downward and further away from the plane in which nozzles 108a, 108b are moving. At this point, the apparatus is prepared to lay down a second layer of material upon the initial layer that is contacting build plate 120. The remainder of the workpiece is constructed by iteratively lowering the build plate using Z-axis motor 112c and then coordinating the motion of nozzles 110a,110b to deposit extruded filament under the control of X-axis motor 112a, Y-axis motor 112 b, and either or both of extruder drives 104a and 104b. This process is repeated until all layers have been deposited and the workpiece is completed.

For clarity and simplicity, FIG. 1 is mainly a conceptual drawing and excludes many gantries, support structures or framework and other details such as pulleys, belts, wires, linear and rotary bearings, thrust bearings, etc. It should be understood that motors, leadscrews and other components, whether shown in the drawings or mentioned in the text, are mechanically coupled or rigidly attached to an overall foundation or common frame of the system 1100, even though, for clarity in the sketches, it is not explicitly shown and may vary in design and construction. Such frames are commonly made of rigid members made of aluminum, steel, acrylic panels, birch plywood and even plastics that have been 3D printed. By the presence of a unified frame, motors 1112a, 1112b, 1160, 1170 cause relative motion between the build plate (and therefore the workpiece) and either or both extrusion nozzles shown.

A first nozzle position motor 1112a acts to control axial displacement of nozzle 1110a relative to the build plate's center of rotation 1165. For example, motor 1112a may turn a leadscrew 114a which drives block 1108a inward toward the center of rotation 1165 or outward way from center of rotation 1165. Alternatively, motor 112a may act upon pulleys, belts, cams, gears or other well-known elements to effect fine control over the positioning of nozzle 1110a towards and away from the center of rotation of the build plate. In similar fashion, a second nozzle position motor 1112b may control the positioning of nozzle 1110b, coupled through elements such as leadscrew 1114b. For simplicity in the diagram, leadscrew threads are not shown but it is implied that motors 1112a, 1112b may contain thrust bearings or be coupled to a leadscrews assemblies that include thrust bearings coupled to a stationary frame of the overall machine that the motive force against block 1108a may bear against. Block 1108a,b may contain a complementary nut or threaded member that couples to the leadscrew threads. Furthermore, blocks 1108a,b may be coupled to linear bearings, lubricated slides, Peaucellier linkages or the like which allow for linear motion in the desired axis as driven by the leadscrew but which also prevent the block from turning in the same direction that the corresponding leadscrew turns. The real-time motion controller controls the first and second nozzle position motors by conducting motor drive signals through connections N1 and N2.

In FIG. 11, the description of the roles and attributes of real-time motion controller 1130, computer 1140 and the passage of G-code instructions 1132 therebetween is substantially the same as for the respective counterparts shown and described in FIG. 1. It is noted that, in system 1100, real-time controller 1130 controls one additional motor channel compared to FIG. 1. The different axes of motion made available in system 1100 versus system 100 are taken into account by the tool path computer and its software in preparing discrete toolpath commands for the real-time controller. The accommodation of an additional axis (or even more axes) is well known and practiced in the field of multi-axis motion controllers.

In the preceding description, various exemplary embodiments have been described with reference to the accompanying drawings. It will be evident, however, that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. In an additive manufacturing system for fabricating an object according to a design description of the object describing which portions of a build space are to be occupied by the object once it has been completely fabricated, and including a machine having a first extrusion nozzle for depositing a first extruded trace having a first nominal trace width, at least one second extrusion nozzle for depositing a second extruded trace having a second nominal trace width and a motion controller for controlling motors of the machine that cause relative motion between the nozzles and a build plate, a method for controlling the motion of said extrusion nozzles to form a surface of the object, comprising:

upon at least a portion of a surface of the object, determining a multiple extrusion surface region that is to be substantially formed by using both the first extruded trace and the second extruded trace in alternating intervals;

along a plane that intersects the object according to the design description, determining at least one designed surface contour of the object that lies within the plane and is included within the multiple extrusion surface region;

defining a first candidate tool path in the plane, paralleling the contour, that will cause either the first or second nozzle to deposit an extruded trace substantially conforming to the designed surface contour;

defining a second candidate tool path in the plane, paralleling the contour and displaced from the first candidate tool path by a distance greater than or equal to the lesser of the first or second nominal trace widths;

at a first interval along the designed surface contour, controlling the motion of the first extrusion nozzle to follow the first candidate tool path while depositing the first extruded trace and controlling the motion of the second extrusion nozzle to follow the second candidate path while depositing the second extruded trace, wherein the first extruded trace is interposed between the designed surface contour and the second extruded trace over the first interval;

at a second interval along the designed surface contour, adjacent to the first interval, controlling the motion of the first extrusion nozzle to follow the second candidate tool path while depositing the first extruded trace and controlling the motion of the second extrusion nozzle to follow the first candidate tool path while depositing the second extruded trace, wherein the second extruded trace is interposed between the designed surface contour and the first extruded trace over the second interval; and at a third interval along the designed surface contour, adjacent to the second interval, controlling the motion of the first extrusion nozzle to follow the first candidate tool path while depositing the first extruded trace and controlling the motion of the second extrusion nozzle to follow the second candidate path while depositing the second extruded trace.

2. The method of claim 1 further comprising:

assembling and providing to the motion controller a set of one or more sequential motion control commands to implement a first composite toolpath for the first extrusion nozzle, the first composite tool path directing the first nozzle to move substantially directly from following the first candidate tool path over the first interval, to following the second candidate tool path over the second interval and then to following the first candidate tool path over the third interval without diverting away from the vicinity of the three intervals; and assembling and providing to the motion controller a set of one or more sequential motion control commands to implement a second composite toolpath for the second extrusion nozzle, the second composite toolpath directing the second nozzle to move substantially directly from following the second candidate tool path over the first interval, to following the second candidate tool path over the second interval and then to following the third candidate loot path over the third interval without diverting away from the vicinity of the three intervals.

3. The method of claim 2 wherein the first toolpath maintains the first extrusion nozzle within a finite number of extrusions widths from the designed contour.

4. The method of claim 2 wherein a first cumulative distance travelled by the first nozzle in following the first composite toolpath is approximately equal to a second cumulative distance travelled by the second nozzle in following the second composite toolpath.

5. The method of claim 2 wherein a first cumulative distance travelled by the first nozzle in following the first composite toolpath and a second cumulative distance travelled by the second nozzle in following the second composite toolpath are each less than twice a cumulative length of the designed contour measured across the first, second and third intervals.

6. The method of claim 2 wherein, when depositing a first extruded trace according to the first composite toolpath, the first nozzle passes over at least one point where the second extrusion nozzle has already deposited an extruded trace.

7. The method of claim 1 wherein the locations of the first, second and third intervals within the multiple extrusion surface region are determined by interpreting data values within at least one of the set comprising: a raster graphics data structure, a bitmap file, a compressed image file, a vector graphics data structure, a text font, a text character generator, and a pattern-calculating function.

8. The method of claim 7 wherein at least three points on the surface of the object are correlated to corresponding locations within a graphic feature encoded by a graphic data structure.

9. In an additive manufacturing system for fabricating an object according to a design description of the object describing which portions of a build space are to be occupied by the object once it has been completely fabricated, and including a machine having a first extrusion nozzle for depositing a first extruded trace having a first nominal trace width, at least one second extrusion nozzle for depositing a second extruded trace having a second nominal trace width and a motion controller for controlling motors of the machine that cause relative motion between the nozzles and a build plate, a method for controlling the motion of said extrusion nozzles to form a surface of the object, comprising:

upon at least a portion of a surface of the object, determining a multiple extrusion surface region that is to be substantially formed by using both the first extruded trace and the second extruded trace in alternating intervals;

along a plane that intersects the object according to the design description, determining at least one designed surface contour of the object that lies within the plane and is within the multiple extrusion surface region;

at a first interval along the multiple extrusion surface region, directing the motion of the nozzles relative to the build plate in accordance with a first arrangement wherein the first extruded trace is deposited to substantially conform to the design contour and form the surface of the object over the first interval and the second extruded trace is deposited on the side of the first extruded trace opposite the contour such that the first extruded trace is interposed between the design contour and the second extruded trace over the first interval;

at a second interval along the multiple extrusion surface region, adjacent to the first interval, directing the motion of the nozzles in accordance with second arrangement wherein the second extruded trace is deposited to conform with the designed contour and form the surface of the object over the second interval and the first extruded trace is deposited on the side of the second extruded trace opposite the designed surface contour and the second trace is interposed in the plane between the designed surface contour and the first extruded trace over the second interval; and at a third interval portion along the multiple extrusion surface region, adjacent to the second interval, directing the toolpaths of the nozzles in accordance with the first arrangement.

\* \* \* \* \*